(12) United States Patent
Tanaka et al.

(10) Patent No.: US 8,844,485 B2
(45) Date of Patent: Sep. 30, 2014

(54) VALVE TIMING CONTROLLER

(71) Applicants: Denso Corporation, Kariya (JP); Nippon Soken, Inc., Nishio (JP)

(72) Inventors: Takehiro Tanaka, Okazaki (JP); Takashi Yamaguchi, Obu (JP); Makoto Otsubo, Anjo (JP); Shuhei Oe, Nukata-gun (JP); Taketsugu Sasaki, Nagoya (JP); Yuusuke Yasuki, Nishio (JP); Kuniaki Oka, Nishio (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 91 days.

(21) Appl. No.: 13/761,880

(22) Filed: Feb. 7, 2013

(65) Prior Publication Data

US 2013/0199478 A1 Aug. 8, 2013

(30) Foreign Application Priority Data

Feb. 8, 2012 (JP) .................................. 2012-25458
Jun. 18, 2012 (JP) ................................ 2012-137238

(51) Int. Cl.
*F01L 1/34* (2006.01)
*F02D 13/02* (2006.01)
*F16K 11/07* (2006.01)
*F01L 1/344* (2006.01)
*F16K 31/06* (2006.01)

(52) U.S. Cl.
CPC .............. *F01L 1/34* (2013.01); *F02D 13/0238* (2013.01); *F01L 2800/01* (2013.01); *F16K 11/07* (2013.01); *F01L 2001/34433* (2013.01); *F01L 2001/34459* (2013.01); *F01L 1/3442* (2013.01); *F16K 31/0613* (2013.01)
USPC ...................................................... 123/90.17

(58) Field of Classification Search
CPC ..................... F01L 2001/34459; F01L 1/3442
USPC ............................................ 123/90.15, 90.17
See application file for complete search history.

(56) References Cited

U.S. PATENT DOCUMENTS

| | | | | |
|---|---|---|---|---|
| 5,924,395 | A * | 7/1999 | Moriya et al. ............. | 123/90.15 |
| 8,677,965 | B2 * | 3/2014 | Kato et al. ................. | 123/179.4 |
| 2008/0011255 | A1 | 1/2008 | Watanabe et al. | |
| 2012/0103289 | A1 * | 5/2012 | Kato et al. ................. | 123/90.15 |
| 2012/0318218 | A1 * | 12/2012 | Kato ......................... | 123/90.12 |

FOREIGN PATENT DOCUMENTS

| | | |
|---|---|---|
| JP | 2002-256910 | 9/2002 |
| JP | 2007-064127 | 3/2007 |
| JP | 4161356 | 8/2008 |

OTHER PUBLICATIONS

Office Action (2 pages) dated Jan. 7, 2014, issued in corresponding Japanese Application No. 2012-137238 and English translation (2 pages).

* cited by examiner

*Primary Examiner* — Thomas Denion
*Assistant Examiner* — Daniel Bernstein
(74) *Attorney, Agent, or Firm* — Nixon & Vanderhye PC

(57) ABSTRACT

A valve timing controller includes a lock mechanism that locks a rotation phase at a main lock phase when an internal combustion engine is started with an ambient temperature more than or equal to a preset temperature. The main lock phase represents a rotation phase set for closing an intake valve at a later timing later than a timing when a piston reaches a bottom dead center of a cylinder in the internal combustion engine. The lock mechanism locks the rotation phase at a sub lock phase representing a rotation phase advanced rather than the main lock phase in the internal combustion engine when the internal combustion engine is started with an ambient temperature lower than the present temperature.

9 Claims, 28 Drawing Sheets

VALVE TIMING CONTROLLER

CROSS REFERENCE TO RELATED APPLICATION

This application is based on Japanese Patent Application No. 2012-25458 filed on Feb. 8, 2012 and Japanese Patent Application No. 2012-137238 filed on Jun. 18, 2012, the disclosures of which are incorporated herein by reference in their entirety.

TECHNICAL FIELD

The present disclosure relates to a valve timing controller which controls valve timing of an intake valve that opens and closes a cylinder of an internal combustion engine.

BACKGROUND

JP-B2-4161356 describes a valve timing controller for an internal combustion engine, and the valve timing controller controls valve timing of an intake valve using pressure of hydraulic fluid. Generally, such a valve timing controller is equipped with a housing rotor interlocked with a crankshaft and a vane rotor interlocked with a camshaft. A rotation phase between the housing rotor and the vane rotor changes when the vane rotor receives the pressure of hydraulic fluid in the housing rotor. The valve timing is controlled by the change in the rotation phase.

In JP-B2-4161356, a rotation phase advanced rather than the most retard phase is defined as an intermediate phase, and the rotation phase is locked at the intermediate phase at the startup time of the internal combustion engine. In this case, the close timing of the intake valve can be made early, therefore the actual compression ratio in the cylinder becomes high. Because the temperature of gas in the cylinder is increased by heat of the compression, fuel evaporation will be promoted. Thus, the startup property of the engine can be raised at the startup time when the engine is activated from a stop condition, for example, after the engine is left under a very low temperature environment.

However, knocking may be generated by the high compression ratio in the cylinder when the engine is started under relatively-high-temperature environment, because the closing timing of the intake valve is early. Moreover, because the temperature of gas in the cylinder at the compression time becomes too much high, pre-ignition (self-ignition before ignition) may be generated at the re-startup time of the engine which is applied to a hybrid system or an idle stop system, or at the re-startup time immediately after the engine is stopped by ignition-off. Furthermore, unpleasant vibration or noise may be generated by large variation in the rotation state of the cranking shaft due to large compression work (reaction force).

SUMMARY

It is an object of the present disclosure to provide a fluid-pressure-operated valve timing controller which achieves a startup of an internal combustion engine suitably for the environmental temperature.

According to an example of the present disclosure, a valve timing controller which controls a valve timing of an intake valve that opens and closes a cylinder of an internal combustion engine using a pressure of working fluid includes a housing rotor, a vane rotor, and a lock mechanism. The housing rotor is rotatable synchronously with a crankshaft of the internal combustion engine. The vane rotor is rotatable synchronously with a camshaft of the internal combustion engine, and receives the pressure of working fluid in the housing rotor such that a rotation phase of the vane rotor with respect to the housing rotor is changed. The lock mechanism locks the rotation phase at a main lock phase when the internal combustion engine is started with an ambient temperature more than or equal to a preset temperature. The main lock phase represents the rotation phase set for closing the intake valve at a later timing later than a timing when a piston reaches a bottom dead center of the cylinder in the internal combustion engine. The lock mechanism locks the rotation phase at a sub lock phase representing the rotation phase advanced rather than the main lock phase in the internal combustion engine when the internal combustion engine is started with an ambient temperature lower than the present temperature.

Accordingly, the internal combustion engine can be started suitably for the ambient temperature.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
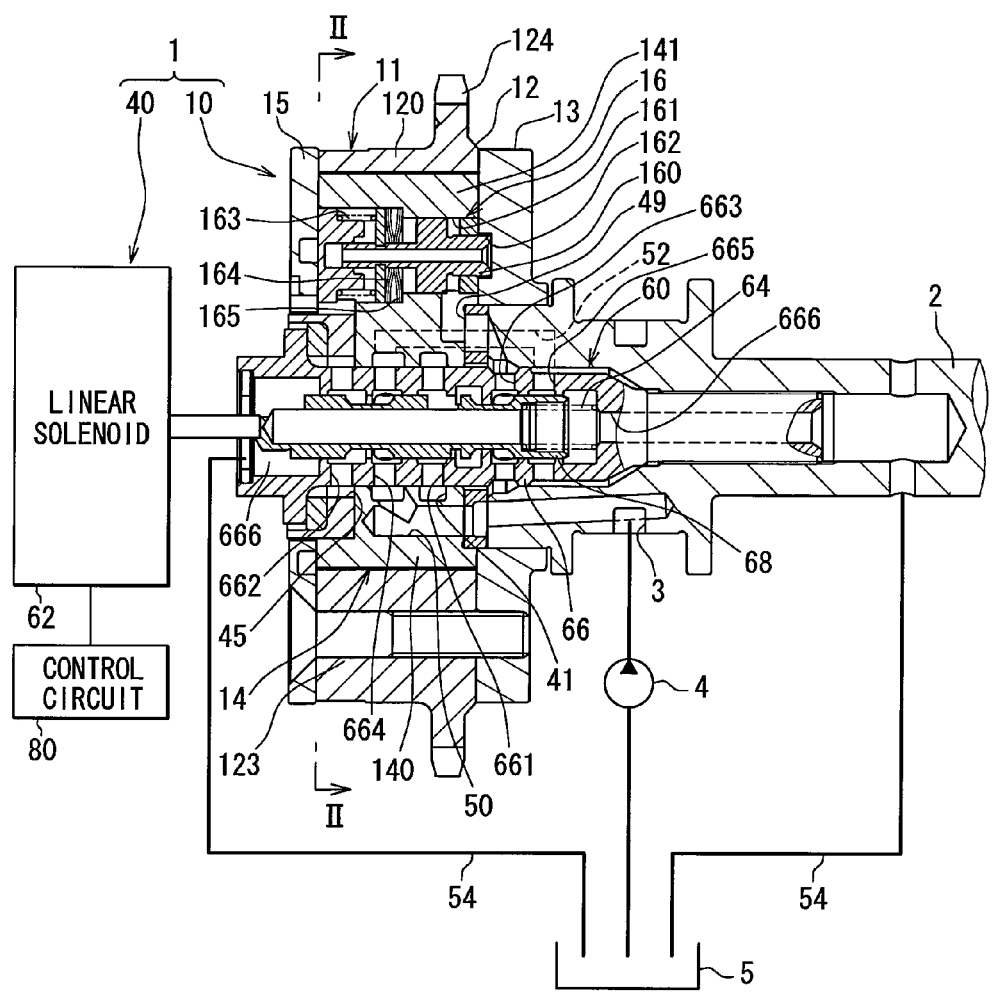
FIG. 1 is a schematic view illustrating a valve timing controller according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

FIG. 1 illustrates a valve timing controller 1 according to a first embodiment which is applied to an internal combustion engine for a vehicle. The valve timing controller 1 is a fluid-pressure-operated controller which uses pressure of hydraulic fluid (working fluid) such as working oil. The valve timing controller 1 controls valve timing of an intake valve 9 (see FIG. 11) that is opened and closed by a camshaft 2, when an engine torque is transmitted from the engine.

A basic structure of the valve timing controller 1 will be described with reference to FIGS. 1-4. The valve timing controller 1 includes a rotation drive unit 10 and a control unit 40. The drive unit 10 is provided in a driving force transmission system, which transmits the engine torque output from a crankshaft (not shown) of the engine to the camshaft 2. The control unit 40 controls supply of working oil to the drive unit 10.

Figure 2:
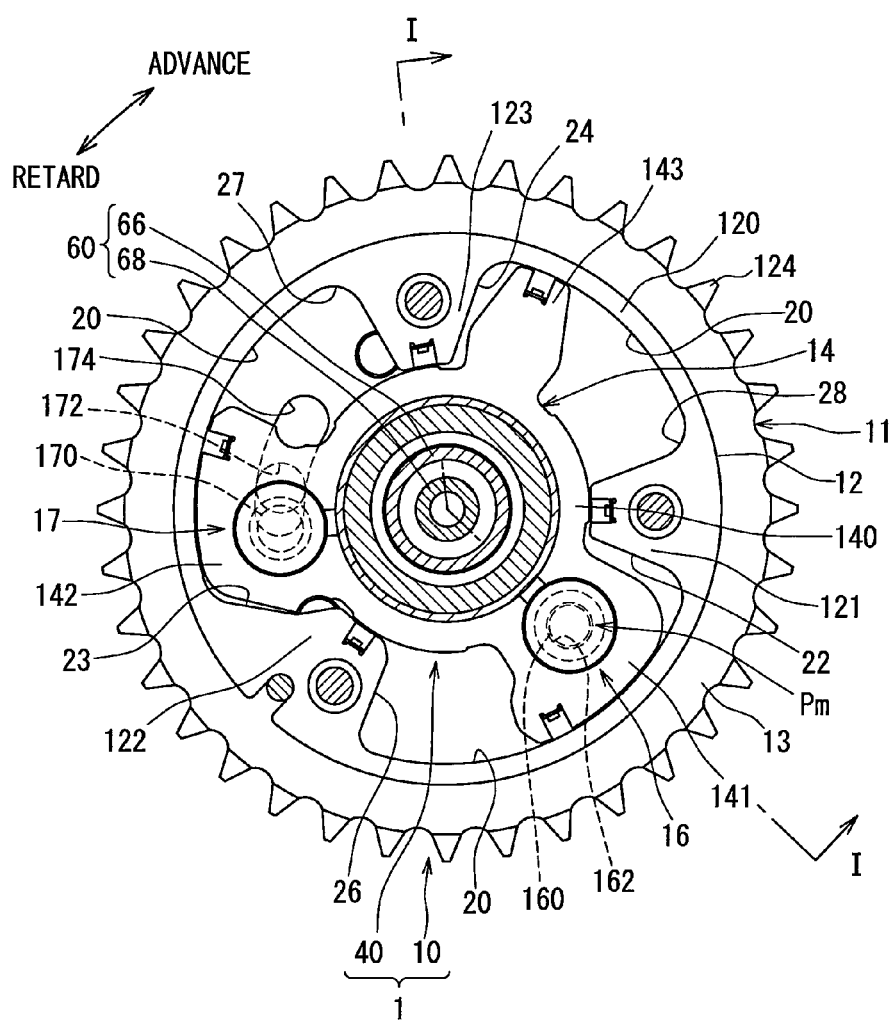
FIG. 2 is a schematic cross-sectional view taken along a line II-II of FIG. 1.

As shown in FIGS. 1 and 2, the drive unit 10 includes a housing rotor 11 made of metal. The housing rotor 11 is constructed by tightening a rear plate 13 and a front plate 15 to axial ends of a shoe ring 12 respectively. The shoe ring 12 has a cylindrical main housing 120, plural shoes 121, 122, 123, and a sprocket 124.

As shown in FIG. 2, the shoes 121, 122, 123 are circumferentially arranged one after another at generally equal intervals on an inner surface of the housing 120 and radially inwardly project from the inner surface of the housing 120.

Plural receiving chambers 20 are defined between the adjacent shoes 121, 122, 123 that are arranged circumferentially in a rotational direction.

The sprocket 124 is connected or linked with the crankshaft via a timing chain (not shown). During an operation of the internal combustion engine, a driving torque is transmitted from the crankshaft to the sprocket 124 such that the housing rotor 11 rotates in a clockwise direction in FIG. 2 together with the crankshaft.

As shown in FIGS. 1 and 2, the drive unit 10 includes a vane rotor 14 made of metal, and the vane rotor 14 is coaxially accommodated in the housing rotor 11. Axial end surfaces of the vane rotor 14 are slidably in contact with the rear plate 13 and the front plate 15 respectively. The vane rotor 14 includes a rotary shaft 140 and plural vanes 141, 142, 143. The rotary shaft 140 is coaxially connected to the camshaft 2. Thus, the vane rotor 14 rotates in the clockwise direction in FIG. 2 (the same direction as the housing rotor 11) together with the camshaft 2, and is rotatable relative to the housing rotor 11.

As shown in FIG. 2, the vanes 141, 142, 143 protrude radially outwardly from the rotary shaft 140 at regular intervals in the circumference direction, and each of the vanes 141, 142, 143 is accommodated in the corresponding receiving chamber 20. Each of the vanes 141, 142, 143 divides the corresponding receiving chamber 20 into two chambers that are arranged one after another in the rotational direction so as to define an advance chamber 22, 23, 24 and a retard chamber 26, 27, 28 for the working oil in the housing rotor 11.

Specifically, the advance chamber 22 is defined between the shoe 121 and the vane 141, the advance chamber 23 is defined between the shoe 122 and the vane 142, and the advance chamber 24 is defined between the shoe 123 and the vane 143. The retard chamber 26 is defined between the shoe 122 and the vane 141, the retard chamber 27 is defined between the shoe 123 and the vane 142, and the retard chamber 28 is defined between the shoe 121 and the vane 143.

As shown in FIGS. 1 and 2, the vane 141 supports a main lock component 160 made of metal in a state where the main lock component 160 is able to slidably reciprocate in the axial direction. The main lock component 160 has a cylindrical shape, and has an axis center deviated from a rotation center of the rotary shaft 140. A main unlock chamber 161 is defined between the vane 141 and the main lock component 160, so as to have an annular space for the working oil.

Figure 5:
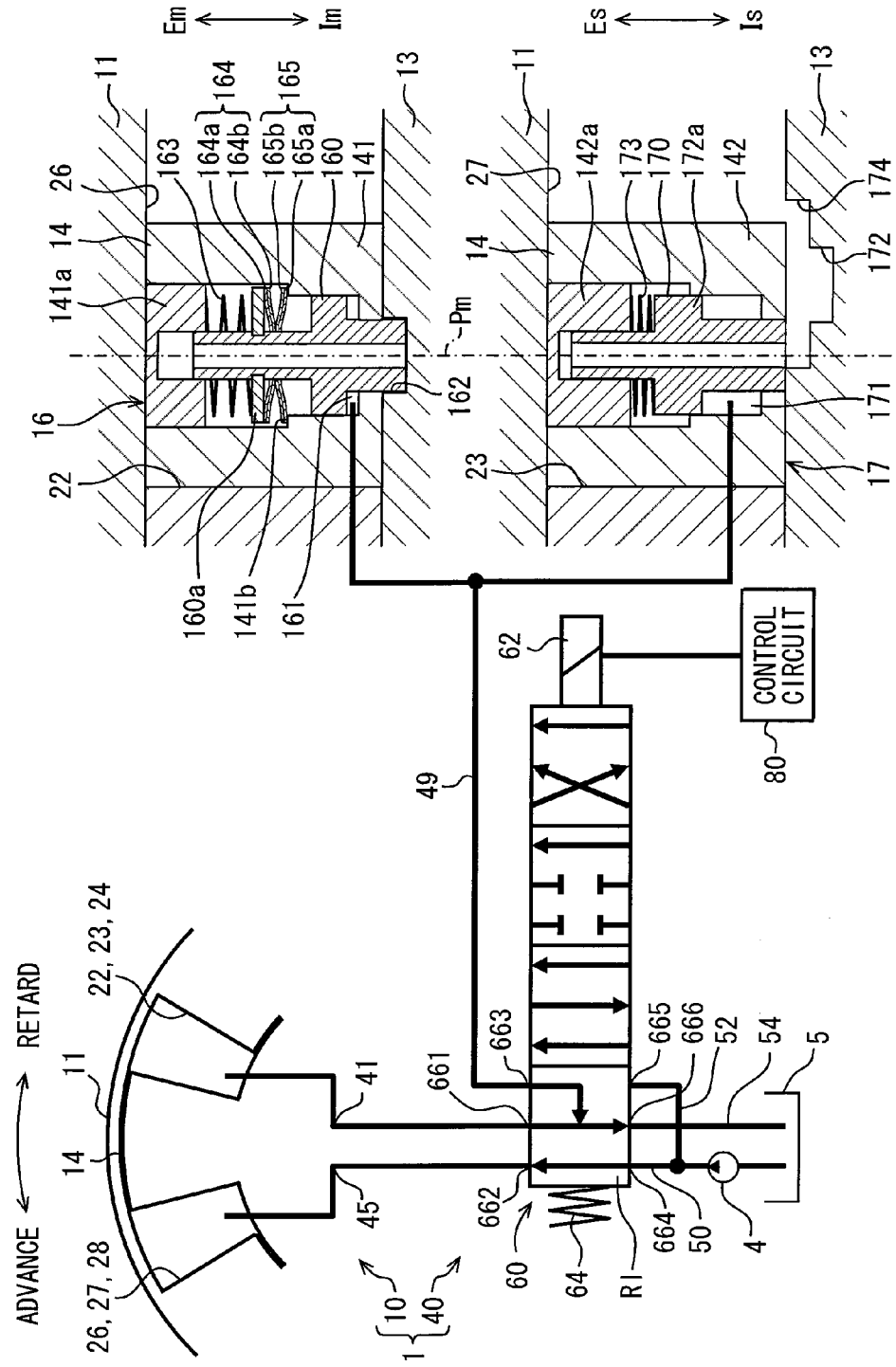
FIG. 5 is an explanatory view illustrating one operation state of the valve timing controller of the first embodiment.

As shown in FIG. 5, the main lock component 160 is fitted into a main lock recess 162 (main lock hole) defined in the rear plate 13 when the pressure of the working oil introduced to the main unlock chamber 161 disappears (decreases). At this time, a rotation phase of the vane rotor 14 relative to the housing rotor 11 (hereinafter referred as just "the rotation phase") is locked at a main lock phase Pm shown in FIG. 2.

Figure 6:
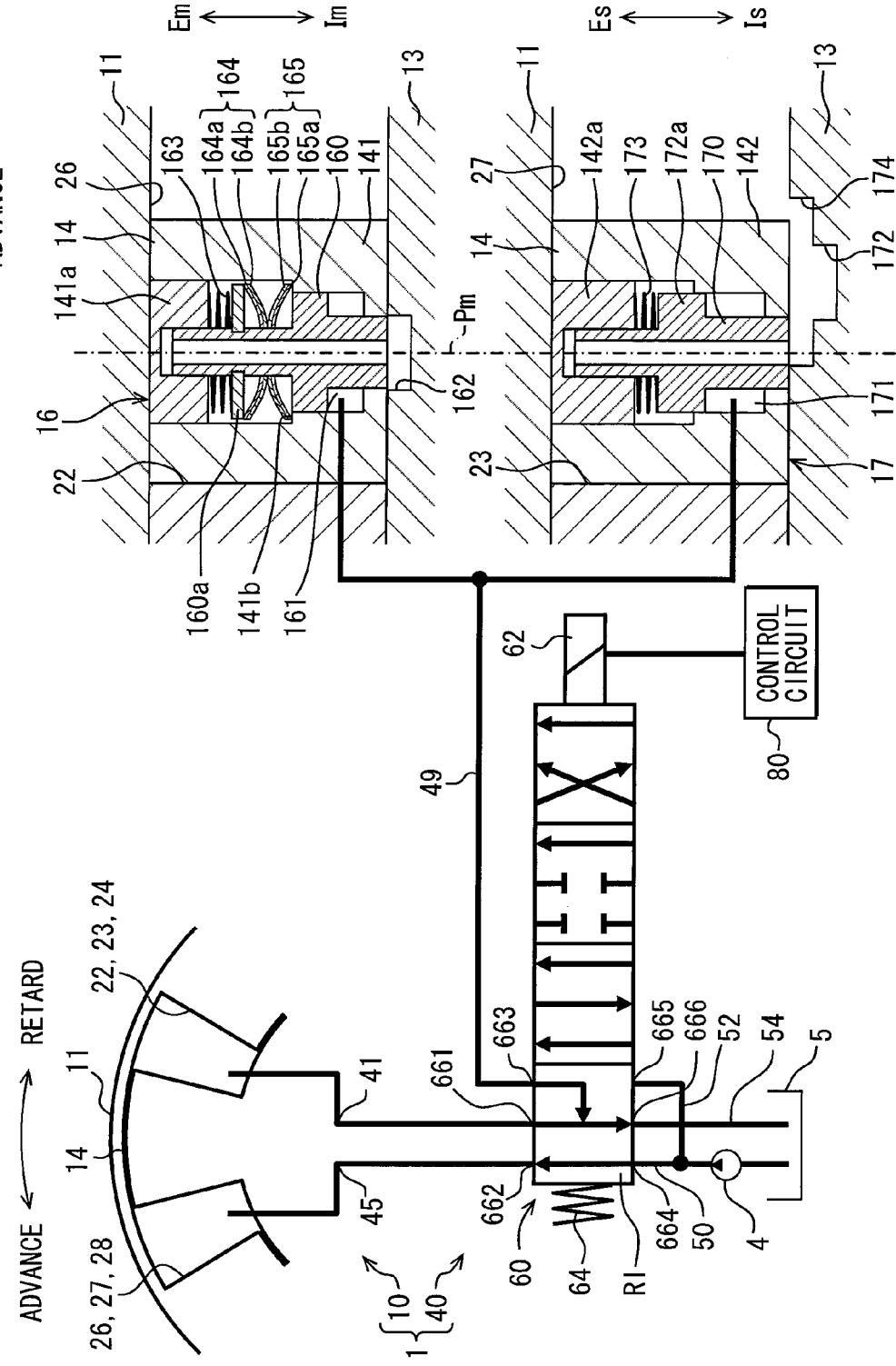
FIG. 6 is an explanatory view illustrating one operation state of the valve timing controller of the first embodiment.
Figure 7:
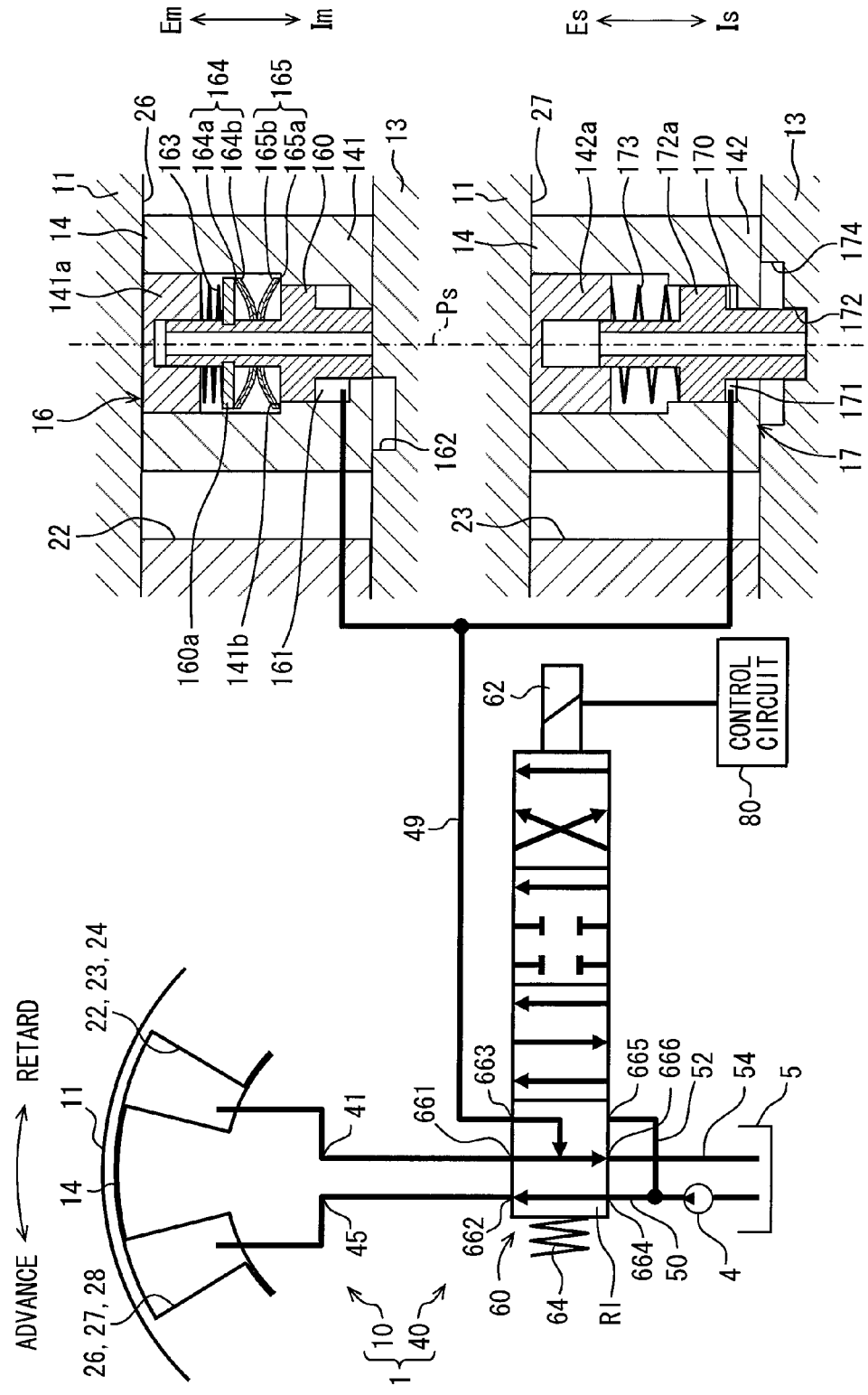
FIG. 7 is an explanatory view illustrating one operation state of the valve timing controller of the first embodiment.
Figure 8:
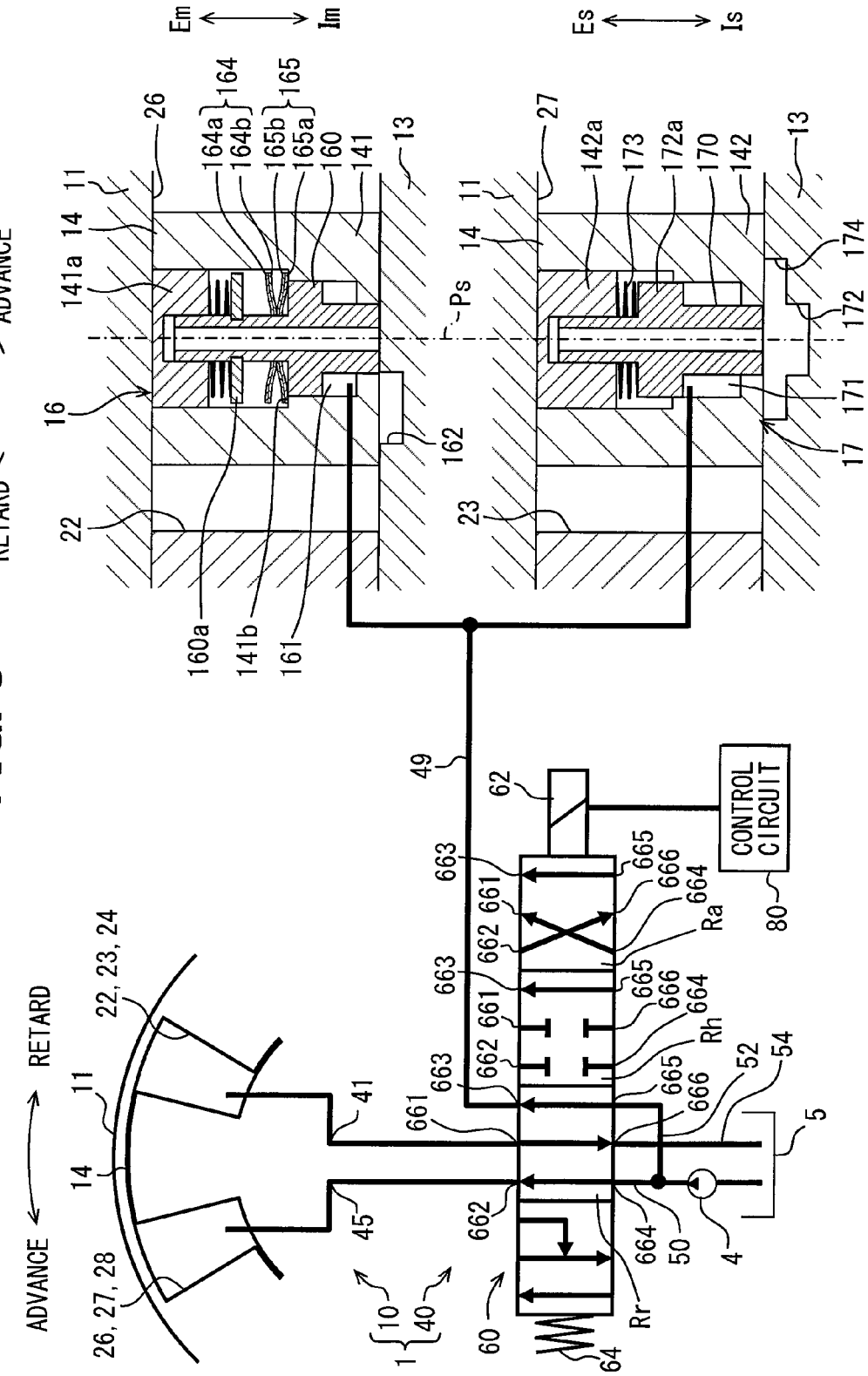
FIG. 8 is an explanatory view illustrating one operation state of the valve timing controller of the first embodiment.

On the other hand, as shown in FIGS. 6-8, the main lock component 160 receives the pressure of the working oil introduced to the main unlock chamber 161. At this time, the main lock component 160 escapes from the main lock recess 162 of the rear plate 13, thereby unlocking the rotation phase from the main lock phase Pm.

Figure 3:
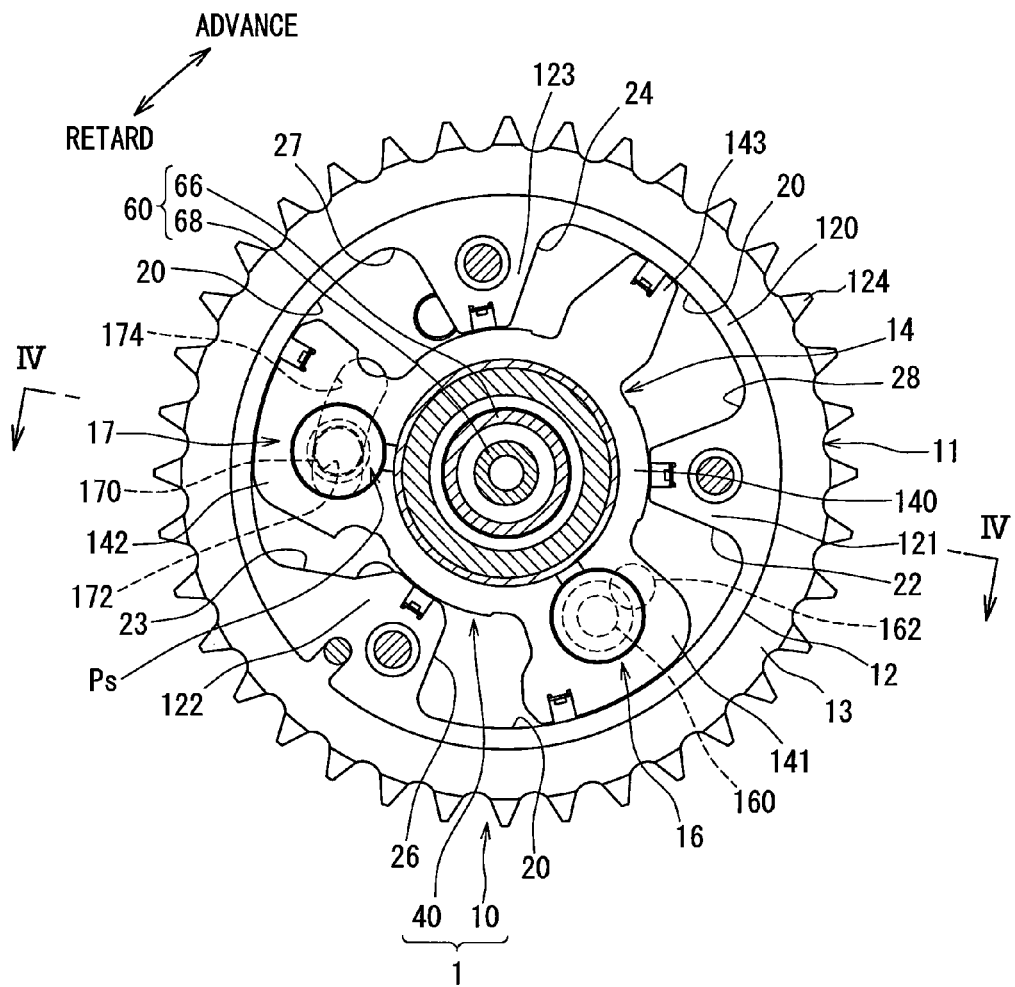
FIG. 3 is a schematic cross-sectional view taken along a line II-II of FIG. 1, in which a rotation phase is advanced from a state shown in FIG. 2.
Figure 4:
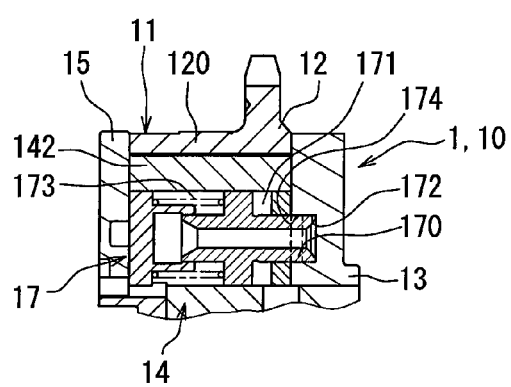
FIG. 4 is a schematic cross-sectional view taken along a line IV-IV of FIG. 3.

As shown in FIGS. 3 and 4, the vane 142 supports a secondary lock (sub lock) component 170 made of metal in a state where the sub lock component 170 is able to slidably reciprocate in the axial direction. The sub lock component 170 has a cylindrical shape, and has an axis center deviated from the rotation center of the rotary shaft 140. A sub unlock chamber 171 is defined between the vane 142 and the sub lock component 170, so as to have an annular space for the working oil.

As shown in FIG. 7, the sub lock component 170 is fitted into a sub lock recess 172 (sub lock hole) defined in the rear plate 13 when the pressure of the working oil introduced to the sub unlock chamber 171 disappears (decreases). At this time, the rotation phase is locked at a sub lock phase Ps shown in FIG. 3.

On the other hand, as shown in FIGS. 5, 6 and 8, the sub lock component 170 receives the pressure of the working oil introduced to the sub unlock chamber 171. At this time, the sub lock component 170 escapes from the sub lock recess 172 of the rear plate 13, thereby unlocking the rotation phase from the sub lock phase Ps.

When the rotation phase is unlocked by each of the lock components 160, 170 in the drive unit 10, the rotation phase is advanced if the working oil is introduced to the advance chambers 22, 23, 24 and is discharged from the retard chambers 26, 27, 28 (for example, see the change from FIG. 2 to FIG. 3). As a result, the valve timing is advanced.

When the rotation phase is unlocked by each of the lock components 160, 170, the rotation phase is retarded if the working oil is introduced to the retard chambers 26, 27, 28 and is discharged from the advance chambers 22, 23, 24 (for example, see the change from FIG. 3 to FIG. 2). As a result, the valve timing is retarded.

In the control unit 40 shown in FIGS. 1 and 5-8, a main advance passage 41 is defined in the rotary shaft 140, and communicates with the advance chambers 22, 23, 24. A main retard passage 45 is defined in the rotary shaft 140, and communicates with the retard chambers 26, 27, 28. An unlock passage 49 is defined in the rotary shaft 140, and communicates with both of the unlock chambers 161, 171.

A main supply passage 50 is defined in the rotary shaft 140 and communicates with a pump 4 through a feed passage 3 defined in the camshaft 2 and a bearing for the camshaft 2. The pump 4 is a supply source of the working oil. The pump 4 is a mechanical pump driven by the internal combustion engine. While the engine is operated, the pump 4 pumps up the working oil from a drain pan 5 and continuously discharges the working oil.

The feed passage 3 may always by able to communicate with a discharge port of the pump 4 irrespective of rotation of the camshaft 2. Therefore, when the cranking and combustion is completed after the engine is started, the working oil is started to be supplied to the main supply passage 50, and the supplying of the working oil is stopped when the engine is stopped.

A sub-supply passage 52 is defined in the rotary shaft 140, and is branched from the main supply passage 50. The sub-supply passage 52 receives the working oil supplied from the pump 4 through the main supply passage 50. A drain recovering passage 54 is defined outside of the drive unit 10 and the camshaft 2. The drain recovering passage 54 is extended to outside (atmospheric air), and discharges the working oil to the drain pan 5. The drain recovering passage 54 and the drain pan 5 correspond to a drain recovering section.

As shown in FIGS. 1 and 2, a control valve 60 is a spool valve which causes a spool 68 to reciprocate in a sleeve 66 in the axial direction using a driving force generated by a linear solenoid 62 and a restoring force generated by a biasing component 64 applied in directions opposite from each other. As shown in FIGS. 1 and 5-8, the sleeve 66 of the control valve 60 has an advance port 661, a retard port 662, an unlock port 663, a main supply port 664, a sub-supply port 665, and a drain port 666.

The advance port 661 communicates with the main advance passage 41. The retard port 662 communicates with the main retard passage 45. The unlock port 663 communicates with the unlock passage 49. The main supply port 664 communicates with the main supply passage 50. The sub-supply port 665 communicates with the sub-supply passage 52. The drain port 666 communicates with the drain recovering passage 54.

The control valve 60 changes the communication state among the ports 661, 662, 663, 664, 665, 666 according to the movement of the spool 68, so as to control the flow of the working oil relative to the chambers 161, 171, 22, 23, 24, 26, 27, 28.

A control circuit 80 is an electronic circuit mainly constructed by a microcomputer, and is electrically connected with the linear solenoid 62 and various electronic components (not shown) of the engine. The control circuit 80 controls operation of the engine and energization of the linear solenoid 62 based on a program stored in the internal memory.

When the control unit 40 controls the spool 68 to move to a lock range RI of FIGS. 5-7, working oil is introduced from the pump 4 to the retard chambers 26, 27, 28, because the retard port 662 communicates with the main supply port 664. Further, in the lock range RI, working oil is discharged from the advance chambers 22, 23, 24 and the unlock chamber 161, 171 to the drain pan 5 because the advance port 661 and the unlock port 663 communicate with the drain port 666. Therefore, in the lock range RI, it becomes possible to lock the rotation phase by one of the lock components 160, 170 because the pressure of the working oil disappears in the unlock chamber 161, 171.

When the spool 68 is moved to a retard range Rr of FIG. 8, working oil of the advance chambers 22, 23, 24 is discharged to the drain pan 5 because the advance port 661 communicates with the drain port 666. Further, in the retard range Rr, working oil is introduced from the pump 4 to the retard chambers 26, 27, 28 and the unlock chamber 161, 171 because the retard port 662 and the unlock port 663 communicate with the main supply port 664 and the sub-supply port 665, respectively. Therefore, in the retard range Rr, the lock components 160, 170 unlock the rotation phase because the lock component 160, 170 receives pressure from the working oil in the unlock chamber 161, 171. Thus, it becomes possible to retard the valve timing by retarding the rotation phase.

When the spool 68 is moved to an advance range Ra of FIG. 8, working oil of the retard chambers 26, 27, 28 is discharged to the drain pan 5 because the retard port 662 communicates with the drain port 666. Further, in the advance range Ra, working oil is introduced from the pump 4 to the advance chambers 22, 23, 24 and the unlock chamber 161, 171 because the advance port 661 and the unlock port 663 communicate with the main supply port 664 and the sub-supply port 665, respectively. Therefore, in the advance range Ra, the lock components 160, 170 unlock the rotation phase because the lock component 160, 170 receives pressure from the working oil in the unlock chamber 161, 171. Thus, it becomes possible to advance the valve timing by advancing the rotation phase.

In addition, when the spool 68 is located in a hold range Rh of FIG. 8, working oil stays in the advance chambers 22, 23, 24 and the retard chambers 26, 27, 28 by shutting the connections among the ports 661, 662, 664, 666. Further, the unlock port 663 communicates with the sub-supply port 665, and working oil is introduced to the unlock chamber 161, 171.

Therefore, in the hold range Rh, the valve timing can be maintained as approximately uniform by restricting a change in the rotation phase which is unlocked.

Figure 9:
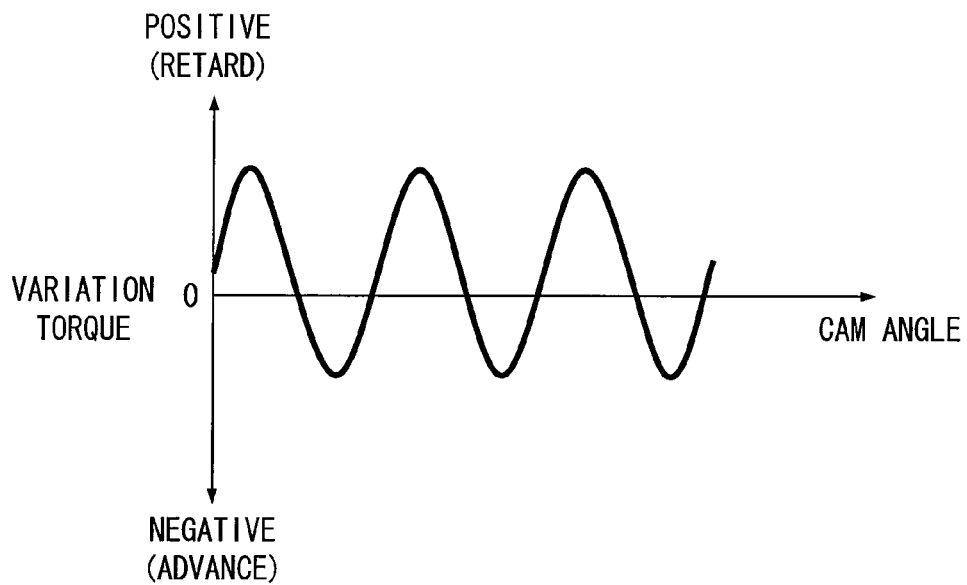
FIG. 9 is a graph illustrating a variation torque applied to the valve timing controller of the first embodiment.

Next, variation torque applied to the vane rotor 14 from the camshaft 2 will be described with reference to FIG. 9.

While the engine is running, a variation (fluctuation) torque caused by a spring reactive force of the intake valve 9 is applied to the vane rotor 14 through the camshaft 2. As shown in FIG. 9, the variation torque alternates between a negative torque applied to the advance side for the housing rotor 11 and a positive torque applied to the retard side for the housing rotor 11. In the present embodiment, the peak value of the positive torque is larger than the peak value of the negative torque, for example, due to friction between the camshaft 2 and the bearing, so the average torque is deviated toward the positive side.

Next, a main lock mechanism 16 will be described in details with reference to FIGS. 1 and 2, which includes a main elastic component 163 and a pair of temperature sensing members 164, 165 in addition to the main lock component 160, the main unlock chamber 161 and the main lock recess 162.

As shown in FIGS. 5-8, the main elastic component 163 is made of metal coil spring, and is disposed in the vane 141. The vane 141 integrally has a spring receiver 141a, and the main lock component 160 integrally has a spring receiver 160a. The main elastic component 163 is interposed to be elastically deformable between the spring receiver 141a of the vane 141 and the spring receiver 160a of the main lock component 160 in the axial direction. Therefore, the main elastic component 163 generates the restoring force which biases the main lock component 160 toward the rear plate 13.

At the main lock phase Pm shown in FIGS. 5 and 6, the restoring force generated by the main elastic component 163 biases the main lock component 160 to be fitted into the main lock recess 162 of the rear plate 13 in a fitting direction Inn. In contrast, a driving force applied to the main lock component 160 from the pressure of oil in the main unlock chamber 161 against the restoring force of the main elastic component 163 biases the main lock component 160 to escape from the main lock recess 162 in an escape direction Em opposite from the fitting direction Im.

Each of the temperature sensing members 164, 165 is made of bimetal having a ring board shape. The bimetal has a high expansion layer 164a, 165a and a low expansion layer 164b, 165b layered with each other, and is accommodated in the vane 141. The high expansion layer 164a, 165a has a coefficient of linear expansion higher than that of the low expansion layer 164b, 165b.

Inner circumference parts of the temperature sensing members 164, 165 are in contact with each other in the axial direction, and are coaxially fitted to the main lock component 160 from the outer side. An outer circumference part of the temperature sensing member 164 is able to contact to or separate from the spring receiver 160a of the main lock component 160, and the high expansion layer 164a is located adjacent to the spring receiver 160a than the low expansion layer 164b is.

The vane 141 integrally has a step part 141b, and an outer circumference part of the temperature sensing member 165 is able to contact to or separate from the step part 141b of the vane 141. The high expansion layer 165a is located adjacent to the step part 141b than the low expansion layer 165b is.

The temperature sensing members 164, 165 are arranged between the main lock component 160 which receives the restoring force of the main elastic component 163 and the vane rotor 14 (support rotor). The temperature sensing member 164, 165 expands or contracts according to the ambient temperature.

Specifically, when the ambient temperature is more than or equal to a preset temperature T (see FIGS. 12 and 13), the expansion of the high expansion layer 164a, 165a is larger than the expansion of the low expansion layer 164b, 165b. At this time, the temperature sensing member 164, 165 is in a first state shown in FIGS. 5 and 8. Therefore, when the pressure disappears in the main unlock chamber 161, the main lock component 160 is allowed to move in the fitting direction Im by the restoring force of the main elastic component 163. Thus, at this time, in the situation where the rotation phase has reached the main lock phase Pm of FIG. 5, the main lock component 160 is allowed to be fitted into the main lock recess 162 due to the restoring force of the main elastic component 163.

On the other hand, when the ambient temperature is less than the preset temperature T, the high expansion layer 164a, 165a shrinks more than the low expansion layer 164b, 165b, so the temperature sensing member 164, 165 is in a second state shown in FIGS. 6 and 7. Therefore, when the pressure disappears in the main unlock chamber 161, the main lock component 160 is biased to move in the escape direction Em, against the restoring force of the main elastic component 163. At this time, in the situation where the rotation phase has reached the main lock phase Pm of FIG. 6, the main lock component 160 escapes from the main lock recess 162 against the restoring force of the main elastic component 163.

In the present embodiment, the preset temperature T may be set in advance, for example, at −10° C. in a manner that the preset temperature T is approximately equal to the ambient temperature of the temperature sensing member 164, 165 when the main lock component 160 escapes from the main lock recess 162, at the main lock phase Pm.

Figure 10:
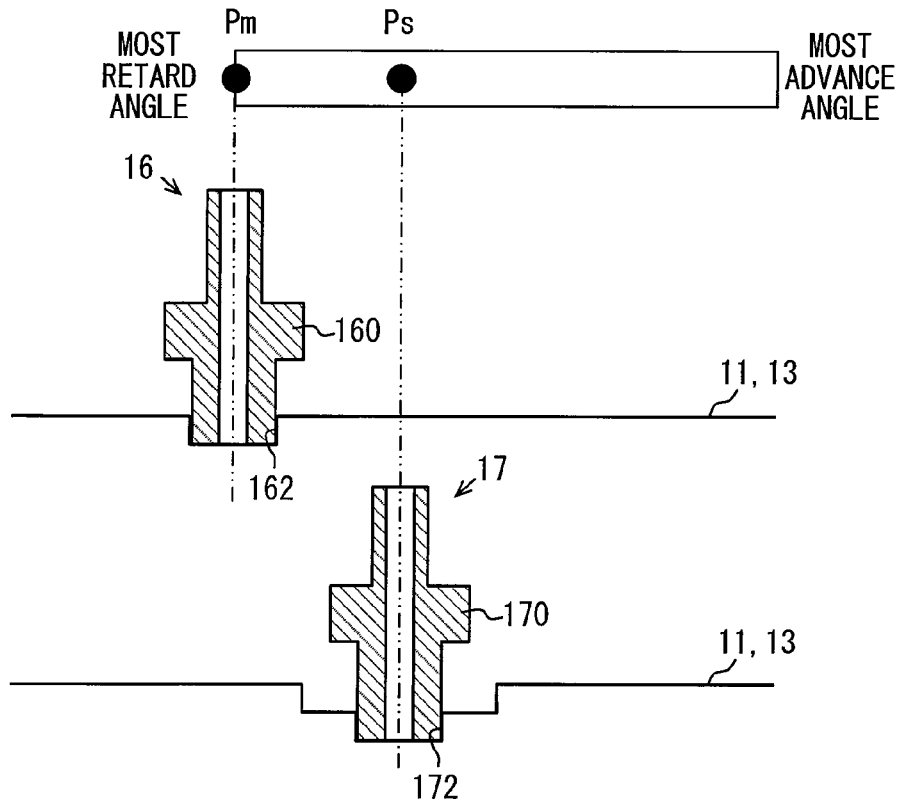
FIG. 10 is a schematic view illustrating characteristics of the valve timing controller of the first embodiment.
Figure 11:
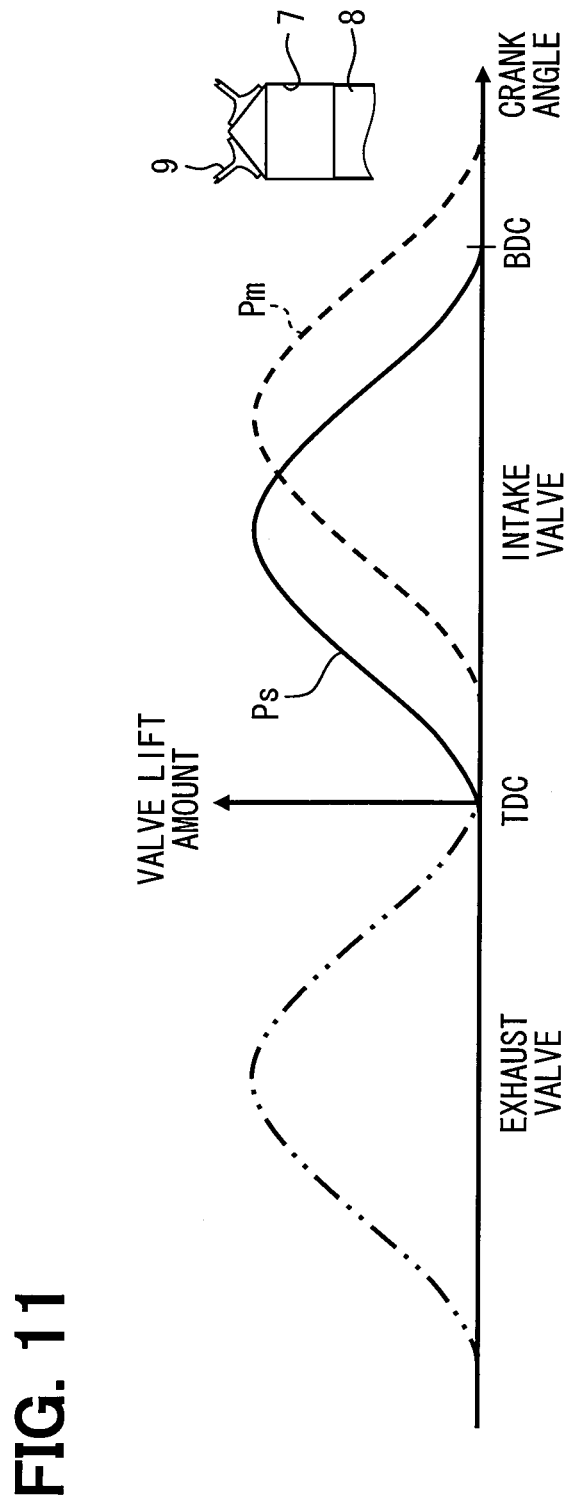
FIG. 11 is an explanatory view illustrating characteristics of the valve timing controller of the first embodiment.

The main lock phase Pm, which is realized by fitting the main lock component 160 into the main lock recess 162, is set in advance to the most retard phase shown in FIGS. 2 and 10. The main lock phase Pm of this embodiment is set in advance, as shown in FIG. 11, to a rotation phase at which the intake valve 9 is closed at a later timing later than a timing when the piston 8 reaches the bottom dead center BDC in the cylinder 7 of the engine.

Next, a sub lock mechanism 17 will be described in details with reference to FIGS. 3 and 4, which includes a sub elastic component 173 and a limit groove 174 in addition to the sub lock component 170, the sub unlock chamber 171, and the sub lock recess 172.

As shown in FIGS. 5-8, the sub elastic component 173 is made of metal coil spring, and is disposed in the vane 142. The vane 142 integrally has a spring receiver 142a, and the sub lock component 170 integrally has a spring receiver 172a. The sub elastic component 173 is interposed to be elastically deformable between the spring receiver 142a of the vane 142 and the spring receiver 172a of the sub lock component 170 in the axial direction. Therefore, the sub elastic component 173 generates the restoring force which biases the sub lock component 170 toward the rear plate 13.

At the sub lock phase Ps shown in FIGS. 7 and 8, the restoring force generated by the sub elastic component 173 biases the sub lock component 170 to be fitted into the sub lock recess 172 of the rear plate 13 in a fitting direction Is. In contrast, a driving force applied to the sub lock component 170 from the pressure of oil in the sub unlock chamber 171 against the restoring force of the sub elastic component 173 biases the sub lock component 170 to escape from the sub lock recess 172 in an escape direction Es.

The limit groove 174 is defined in the rear plate 13, and extends relatively long in the rotation direction. The sub lock recess 172 is defined to be recessed from the bottom of the limit groove 174 at a halfway part in the limit groove 174.

The sub lock component 170 enters the limit groove 174 at a rotation phase in a range front and rear of the sub lock phase Ps, thereby it is possible to restrict the rotation phase to the advance side rather than the main lock phase Pm. Moreover, when the rotation phase reaches the sub lock phase Ps, the sub lock component 170 is able to be fitted into the sub lock recess 172 from the limit groove 174.

The sub lock phase Ps, which is realized by fitting the sub lock component 170 into the sub lock recess 172, is set in advance to a rotation phase advanced rather than the main lock phase Pm, as shown in FIGS. 3 and 10. The sub lock phase Ps of this embodiment is set in advance, as shown in FIG. 11, to a rotation phase at which the intake valve 9 is closed at the same or adjacent timing as a timing when the piston 8 reaches the bottom dead center BDC in the cylinder 7 of the engine.

Next, operation of the valve timing controller 1 of the first embodiment is explained.

(A) Normal Operation

Figure 12:
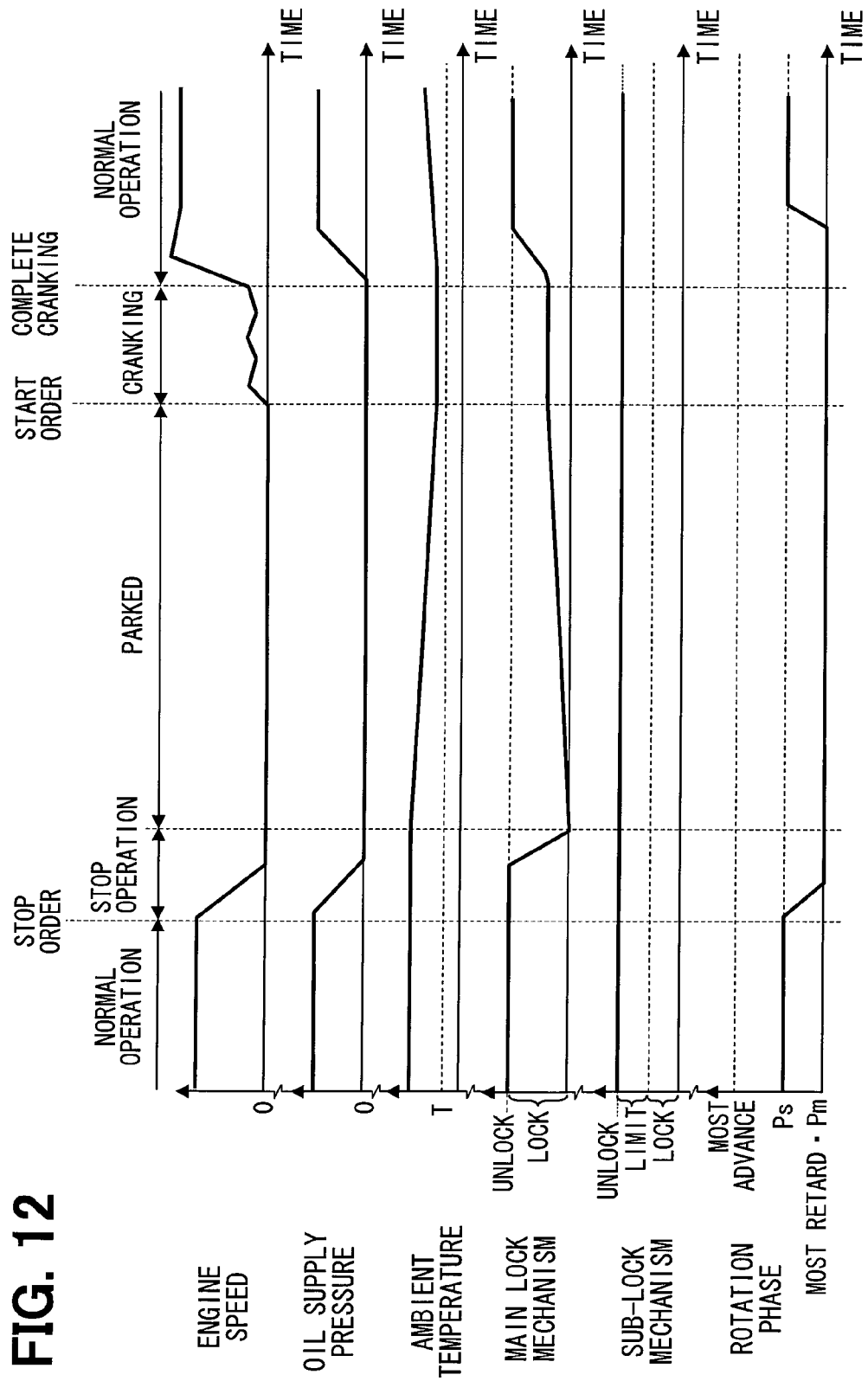
FIG. 12 is a time chart illustrating characteristics of one operation state of the valve timing controller of the first embodiment.
Figure 13:
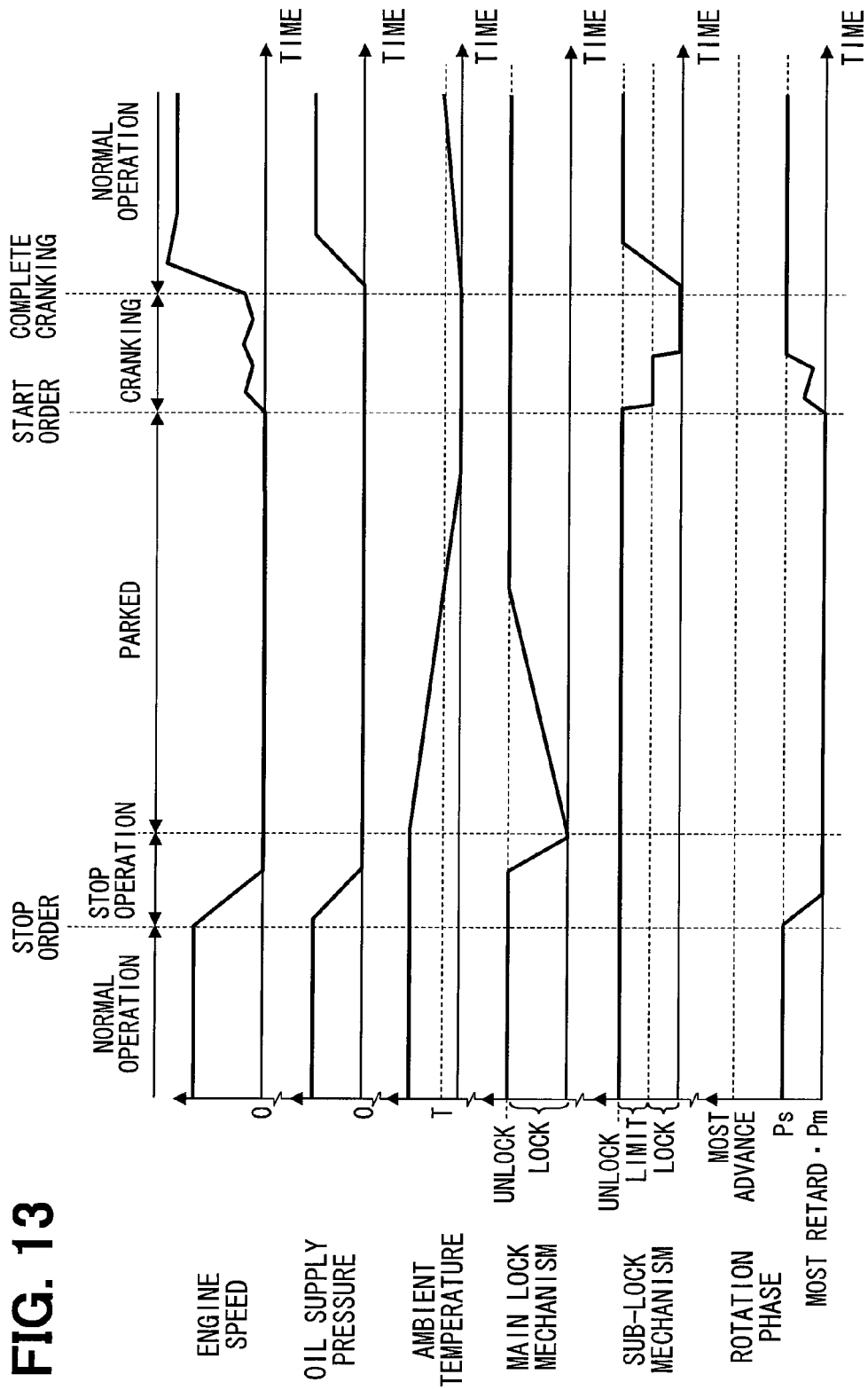
FIG. 13 is a time chart illustrating characteristics of one operation state of the valve timing controller of the first embodiment.
Figure 14:
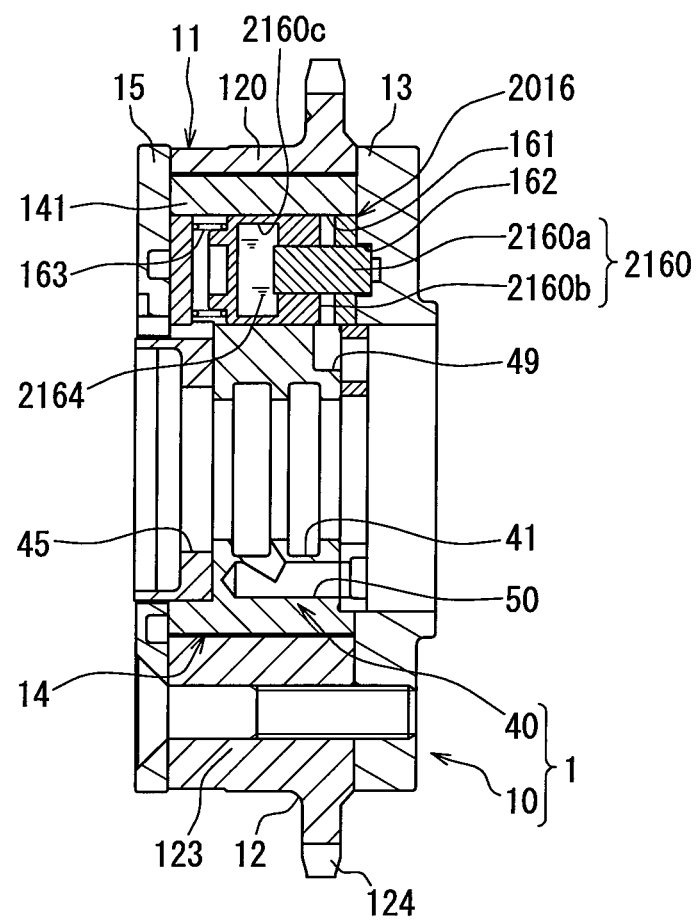
FIG. 14 is a schematic cross-sectional view illustrating a valve timing controller according to a second embodiment.

When the engine is in a normal operation after completing the cranking and combustion, as shown in FIGS. 12 and 13, the supplying of the working oil from the pump 4 is continued with the pressure according to the speed of the engine. Further, the temperature sensing member 164, 165 becomes in the first state (FIG. 8) at the ambient temperature more than or equal to the preset temperature T according to operation of the engine. Therefore, each of the lock components 160, 170 is biased in the escape direction Em, Es by the pressure of the working oil introduced to the unlock chamber 161, 171. Thus, as shown in FIG. 8, while the rotation phase is unlocked from the lock phase Pm, Ps, the valve timing is suitably adjusted by the change in the position of the spool 68 among the ranges Rr, Ra, Rh.

In the normal operation period immediately after the startup of the engine, if the ambient temperature of the temperature sensing member 164, 165 becomes less than the preset temperature T, the temperature sensing member 164, 165 will be in the second state. However, since each of the lock components 160, 170 is biased in the escape direction Em, Es by the pressure of the unlock chamber 161, 171, the rotation phase is unlocked from the lock phase Pm, Ps also in this case.

(B) Stop Operation

When the engine of the vehicle is stopped by a stop order such as turning off an engine switch, as shown in FIGS. 12 and 13, the pressure of the working oil supplied from the pump 4 decreases gradually according to the inertia rotating speed of the engine. At this time, the spool 68 is moved to the lock range RI while the rotation phase is unlocked from the lock phase Pm, Ps, similarly to the above-described normal operation case, because the supply pressure of the working oil is comparatively high. As a result, as shown in FIGS. 12 and 13, after the rotation phase reaches the main lock phase Pm (the most retard phase), the engine will be completely stopped from rotating at the main lock phase Pm.

(C) Start with Temperature More than or Equal to the Preset Temperature T

When the engine of the vehicle is started by a start order such as turning on an engine switch, as shown in FIG. 12, the supplying of the working oil from the pump 4 is not started until the cranking and combustion is completed. Further, the temperature sensing member 164, 165 will be in the first state (FIG. 5) with the ambient temperature more than the preset temperature T.

Immediately after the startup, the rotation phase is located at the main lock phase Pm. Further, the position of the spool 68 is maintained at the lock range RI before the cranking and combustion is completed. Therefore, the main lock component 160 which receives the restoring force of the main elastic component 163 is fitted into the main lock recess 162, because the pressure disappears in the main unlock chamber 161 (FIG. 5).

Furthermore, the sub lock component 170 which receives the restoring force of the sub elastic component 173 contacts the rear plate 13 outside of the sub lock recess 172 and the limit groove 174, when the pressure disappears in the sub unlock chamber 171 (FIG. 5). Therefore, as shown in FIG. 12, the cranking and combustion of the engine is completed in the state where the rotation phase is locked at the main lock phase Pm.

(D) Start with Temperature Less than the Preset Temperature T

When the engine is started by a start order, as shown in FIG. 13, while the supplying of the working oil from the pump 4 is not started, the temperature sensing member 164, 165 will be in the second state (FIG. 6) with the ambient temperature less than the preset temperature T. Immediately after the start order, the rotation phase is located at the main lock phase Pm, and the position of the spool 68 is held in the lock range RI before the complete combustion.

Therefore, the main lock component 160 escapes from the main lock recess 162 (FIG. 6) in a direction opposite from the restoring force of the main elastic component 163 while the pressure disappears in the main unlock chamber 161. Thus, the rotation phase is unlocked from the main lock phase Pm. Then, when the vane rotor 14 receives the negative torque of the variation torque, the vane rotor 14 rotates on the advance side relative to the housing rotor 11, thus the rotation phase is advanced rather than the main lock phase Pm.

As a result, the sub lock component 170 which receives the restoring force of the sub elastic component 173 enters the limit groove 174 at first while the pressure disappears in the sub unlock chamber 171. Therefore, as shown in FIG. 13, the rotation phase is restricted from returning to the main lock phase Pm even if the vane rotor 14 is rotated on the retard side relative to the housing rotor 11 when the positive torque is applied to the vane rotor 14.

Moreover, after the sub lock component 170 enters the limit groove 174, if the rotation phase is further advanced by the negative torque to reach the sub lock phase Ps, the sub lock component 170 which receives the restoring force of the sub elastic component 173 will be fitted into the sub lock recess 172 while the pressure disappears in the sub unlock chamber 171 (FIG. 7).

At this time, the main lock component 160 which receives the restoring force of the main elastic component 163 contacts the rear plate 13 outside of the main lock recess 162 while the pressure disappears in the main unlock chamber 161 (FIG. 7). Therefore, as shown in FIG. 13, the cranking and combustion of the engine is completed in the state where the rotation phase is locked at the sub lock phase Ps.

Operations and advantages of the valve timing controller 1 of the first embodiment are explained.

In the first embodiment, the rotation phase which has reached to the main lock phase Pm is locked by the main lock mechanism 16 when the engine is started with an ambient temperature more than or equal to the preset temperature T. The main lock phase Pm is a rotation phase set for closing the intake valve 9 after the piston 8 reaches the bottom dead center BDC in the cylinder 7.

Therefore, gas in the cylinder 7 is extruded into the intake system because the piston 8 lifts up after reaching the bottom dead center BDC, thereby lowering the actual compression ratio. Thus, when the engine is started under the relatively-high-temperature environment more than or equal to the preset temperature T, knocking, pre-ignition, and unpleasant vibration or noise can be restricted from being generated.

According to the first embodiment, when the engine is started with an ambient temperature less than the preset temperature T, the rotation phase locked at the main lock phase Pm is unlocked by the main lock mechanism 16. Therefore, the vane rotor 14 rotates on the advance side relative to the housing rotor 11 by the negative torque which acts from the camshaft 2. As a result, if the rotation phase reaches to the sub lock phase Ps advanced rather than the main lock phase Pm, the rotation phase is locked by the sub lock mechanism 17, and the closing timing of the intake valve 9 will be made early as much as possible.

Therefore, the push-out amount of the gas out of the cylinder 7 decreases, and the temperature in the cylinder 7 rises together with the actual compression ratio. Thus, ignitionability is raised to secure the start-up properties, for example, even if the engine is started under the relatively-low-temperature environment less than the preset temperature T, for example, after the vehicle is parked under very-low-temperature environment.

Accordingly, the engine can be started suitably for the environmental temperature.

Moreover, according to the main lock mechanism 16 of the first embodiment, the main lock component 160 supported by the vane rotor 14 is fitted to or separated from the main lock recess 162 of the housing rotor 11, thereby the rotation phase is locked at or unlocked from the main lock phase Pm. The main lock component 160 which is biased in the fitting direction Im in response to the restoring force of the main elastic component 163 is allowed to be fitted into the main lock recess 162 by the temperature sensing member 164, 165 becoming in the first state at the ambient temperature higher than or equal to the preset temperature T.

Therefore, at the engine startup time with the ambient temperature more than or equal to the preset temperature T, the rotation phase which has reached to the main lock phase Pm is locked by the fitting of the main lock component 160 to the main lock recess 162. Thus, knocking, pre-ignition and unpleasant vibration can be restricted with reliability.

Moreover, on the other hand, the temperature sensing member 164, 165 which becomes in the second state at the ambient temperature less than the preset temperature T biases the main lock component 160 in the escape direction Em opposite from the restoring force of the main elastic component 163. Therefore, at the engine startup time with the ambient temperature less than the preset temperature T, the main lock component 160 escapes from the main lock recess 162 thereby unlocking the rotation phase from the main lock phase Pm. Thus, it becomes possible to lock the rotation phase at the sub lock phase Ps using the negative torque, so the start-up properties can be secured. Accordingly, it is possible to improve the reliability of the startup properties of the engine suitably for the environmental temperature.

Furthermore, according to the sub lock mechanism 17 of the first embodiment, similarly to the main lock mechanism 16, the sub lock component 170 supported by the vane rotor 14 is fitted to or separated from the sub lock recess 172 of the housing rotor 11, thereby the rotation phase is locked at or unlocked from the sub lock phase Ps. The main lock component 160 of the main lock mechanism 16 and the sub lock component 170 of the sub lock mechanism 17 are allowed to be fitted into the main lock recess 162 and the sub lock recess 172, respectively, because the pressure of the working oil, which is started to be supplied in accordance with the complete cranking and combustion of the engine, has disappeared at the engine startup time. Therefore, at the engine startup time with the ambient temperature more than or equal to the preset temperature T, the main lock component 160 locks the rotation phase at the main lock phase Pm by fitting with the main lock recess 162, which is permitted also with the temperature sensing member 164, 165.

On the other hand, at the engine startup time with the ambient temperature less than the preset temperature T, the main lock component 160 is biased in the escape direction Em opposite from the restoring force of the main elastic component 163, depending on the temperature sensing member 164, 165, thereby unlocking the rotation phase from the main lock phase Pm. Therefore, when the rotation phase reaches the sub lock phase Ps by the negative torque, the sub lock component 170 which receives the restoring force of the sub elastic component 173 locks the rotation phase by fitting with the sub lock recess 172 while the pressure of working oil disappears. Thus, the rotation phase can be locked at the main lock phase Pm or the sub lock phase Ps according to the environmental temperature, and it becomes possible to improve the reliability of the engine startup suitably for the environmental temperature.

In addition, according to the first embodiment, the main lock component 160 of the main lock mechanism 16 and the sub lock component 170 of the sub lock mechanism 17 are biased in the escape direction Em, Es to escape from the main lock recess 162 and the sub lock recess 172, respectively, by receiving the pressure of working oil. Therefore, during the normal operation after the complete cranking and combustion of the engine, both the main lock component 160 and the sub lock component 170 which receive the pressure of the working oil unlock the rotation phase by the escaping, so the valve timing can be flexibly controlled by a change in the rotation phase.

Furthermore, according to the first embodiment, the temperature sensing member 164, 165 made of the bimetal expands or shrinks based on the ambient temperature, and is arranged between the vane rotor 14 and the main lock component 160. Therefore, the main lock component 160 can operate according to the expansion or shrink state of the temperature sensing member 164, 165. That is, because the temperature sensing member 164, 165 is changed to have the first state when the ambient temperature is more than or equal to the preset temperature T, the main lock component 160 which receives the restoring force of the main elastic component 163 can lock the rotation phase at the main lock phase Pm by fitting with the main lock recess 162.

On the other hand, because the temperature sensing member 164, 165 is changed to have the second state when the ambient temperature is less than the preset temperature T, the main lock component 160 can unlock the rotation phase from the main lock phase Pm by escaping from the main lock recess 162 against the restoring force of the main elastic component 163. Thus, by using the bimetal as the temperature sensing member 164, 165, the main lock mechanism 16 can properly function with the simple structure.

Further, because the pair of the temperature sensing members 164, 165 are arranged in the axial direction, the movement amount of the main lock component 160 is made large in accordance with the expansion or shrink of the temperature sensing member 164, 165. Therefore, the first state and the second state can be switched from each other with reliability.

Accordingly, the engine can be started suitably for the environmental temperature, with high reliability by the simple structure.

Second Embodiment

As shown in FIGS. 14-18, a second embodiment is a modification of the first embodiment.

A main lock mechanism 2016 according to the second embodiment will be described. A main lock component 2160 of the main lock mechanism 2016 is constructed by a piston 2160a made of metal and a movable cylinder 2160b made of metal. Specifically, the piston 2160a has a column shape to be fitted to or separated from the main lock recess 162, and is accommodated in the vane 141 so as to be reciprocatable in the axial direction. The movable cylinder 2160b has a cylindrical shape defining an internal chamber 2160c inside, and the piston 2160a is coaxially fitted to or separated from the internal chamber 2160c. The movable cylinder 2160b is supported by the vane 141 so as to be reciprocatable in the axial direction.

The piston 2160a is fitted to an end part of the movable cylinder 2160b so as to seal a temperature sensing member 2164 (to be described in detail below) in the internal chamber 2160c, thereby the piston 2160a is supported by the vane 141 through the movable cylinder 2160b. Moreover, due to a slip-off stop structure (not shown), the piston 2160a is restricted from slipping off from the movable cylinder 2160b in the state of FIGS. 15 and 18 where the piston 2160a is separated from the internal chamber 2160c. Furthermore, the main unlock chamber 161 is defined between the movable cylinder 2160b and the vane 141, and the main elastic component 163 is interposed between the movable cylinder 2160b and the spring receiver 141a of the vane 141.

Figure 15:
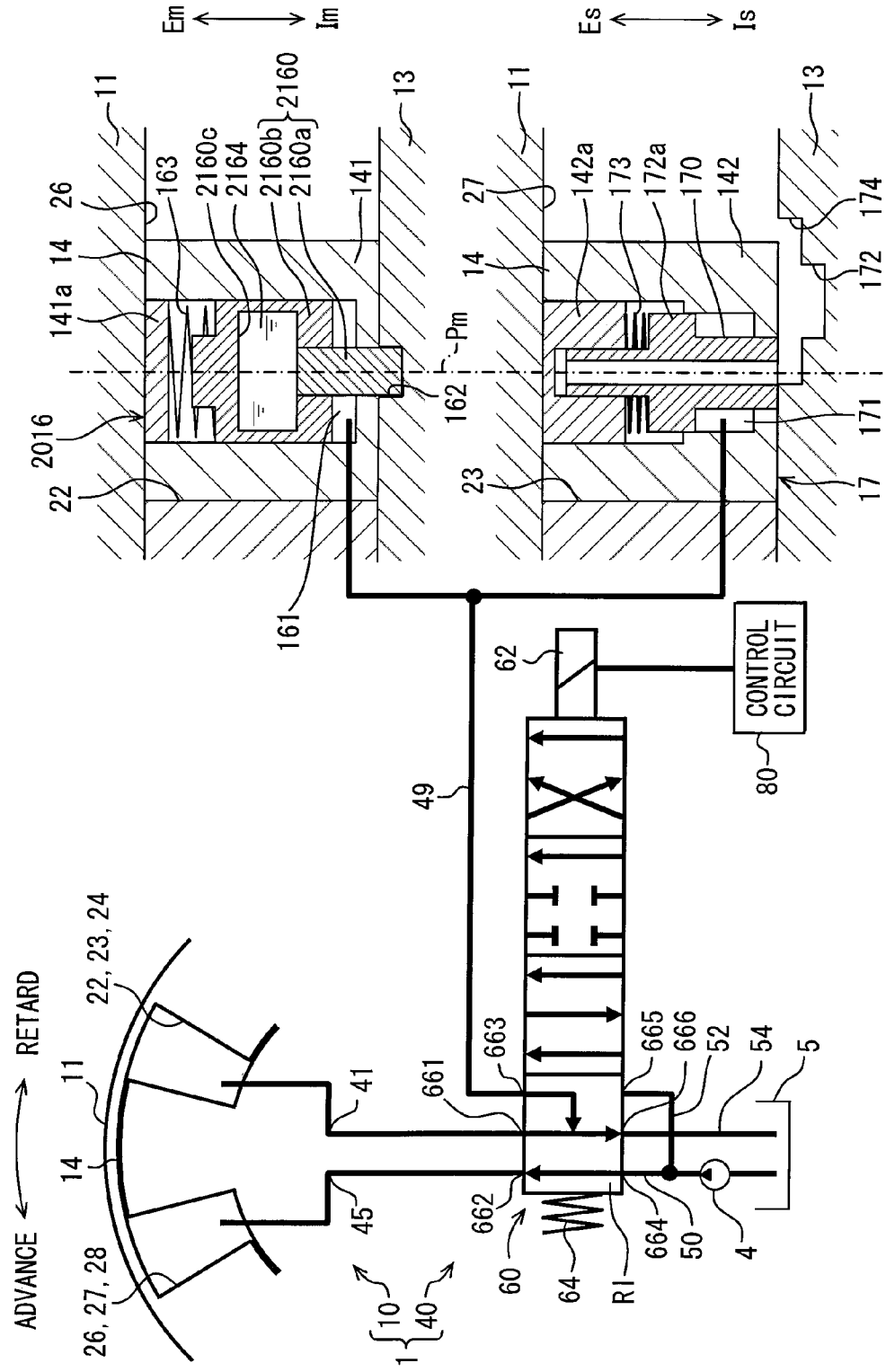
FIG. 15 is an explanatory view illustrating one operation state of the valve timing controller of the second embodiment.

As shown in FIG. 15, the piston 2160a which receives the restoring force of the main elastic component 163 through the movable cylinder 2160b is fitted to the main lock recess 162 when the pressure of the working oil which contacts the movable cylinder 2160b disappears in the main unlock chamber 161. Thus, the rotation phase is locked at the main lock phase Pm set in advance by the piston 2160a, similarly to the first embodiment. On the other hand, as shown in FIGS. 16-18, the piston 2160a escapes from the main lock recess 162 in a direction opposite from the restoring force of the main elastic component 163 by receiving the pressure of the main unlock chamber 161, thereby unlocking the rotation phase from the main lock phase Pm.

Furthermore, as shown in FIGS. 14-18, the temperature sensing member 2164 of the main lock mechanism 2016 of the second embodiment is made of liquid-state non-compression thermo-wax enclosed in the internal chamber 2160c of the movable cylinder 2160b. The temperature sensing member 2164 expands or shrinks according to the ambient temperature in the movable cylinder 2160b which receives the restoring force of the main elastic component 163.

Figure 18:
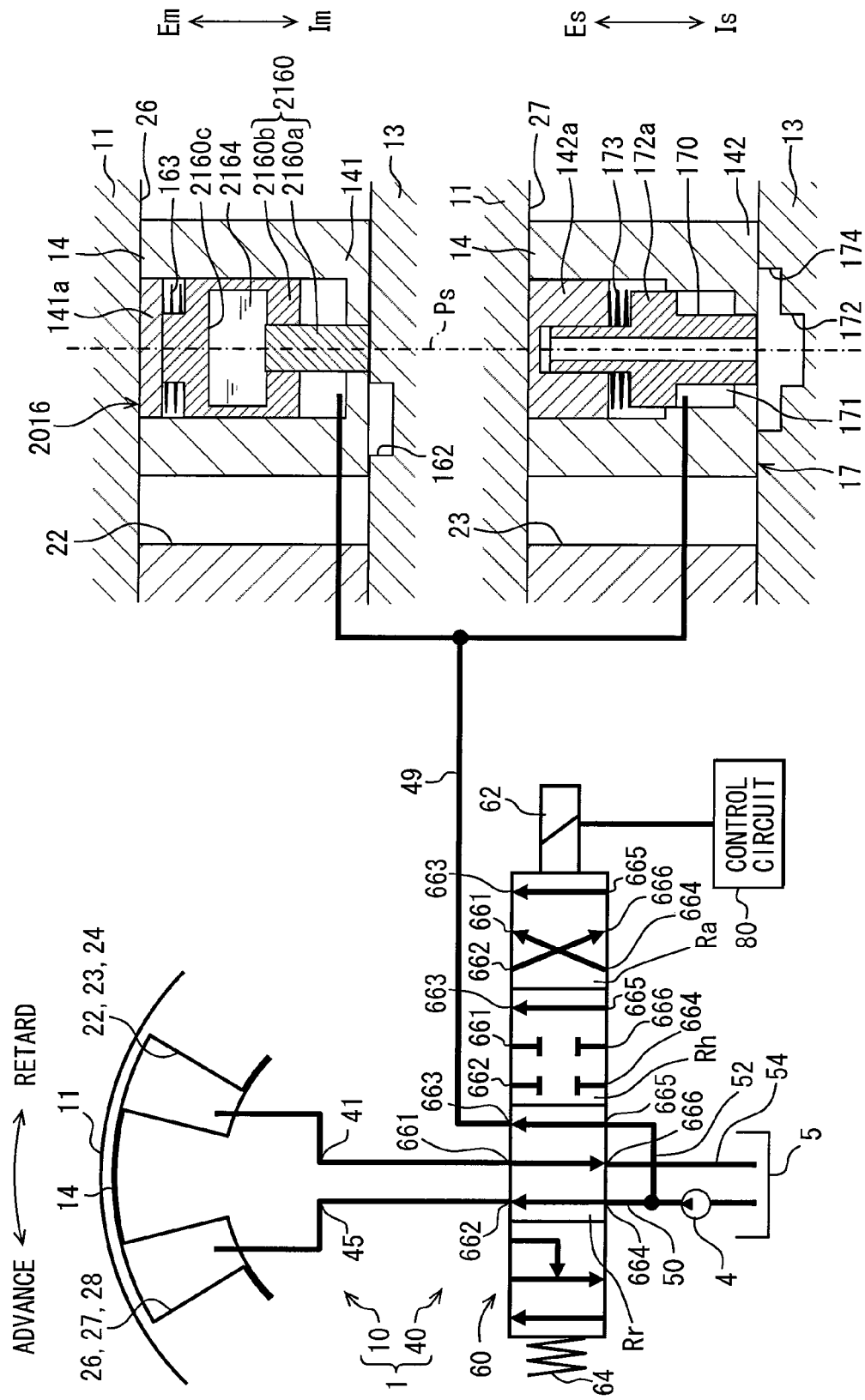
FIG. 18 is an explanatory view illustrating one operation state of the valve timing controller of the second embodiment.

Specifically, when the ambient temperature becomes more than or equal to the preset temperature T, the volume of the temperature sensing member 2164 is increased, so the temperature sensing member 2164 is changed to have the first state shown in FIGS. 15 and 18. Therefore, when the pressure disappears in the main unlock chamber 161, the movable cylinder 2160b and the piston 2160a are allowed to move in the fitting direction Im by the restoring force of the main elastic component 163. At this time, the piston 2160a which receives the restoring force of the main elastic component 163 is allowed to be fitted to the main lock recess 162 in the situation where the rotation phase has reached the main lock phase Pm of FIG. 15.

Figure 16:
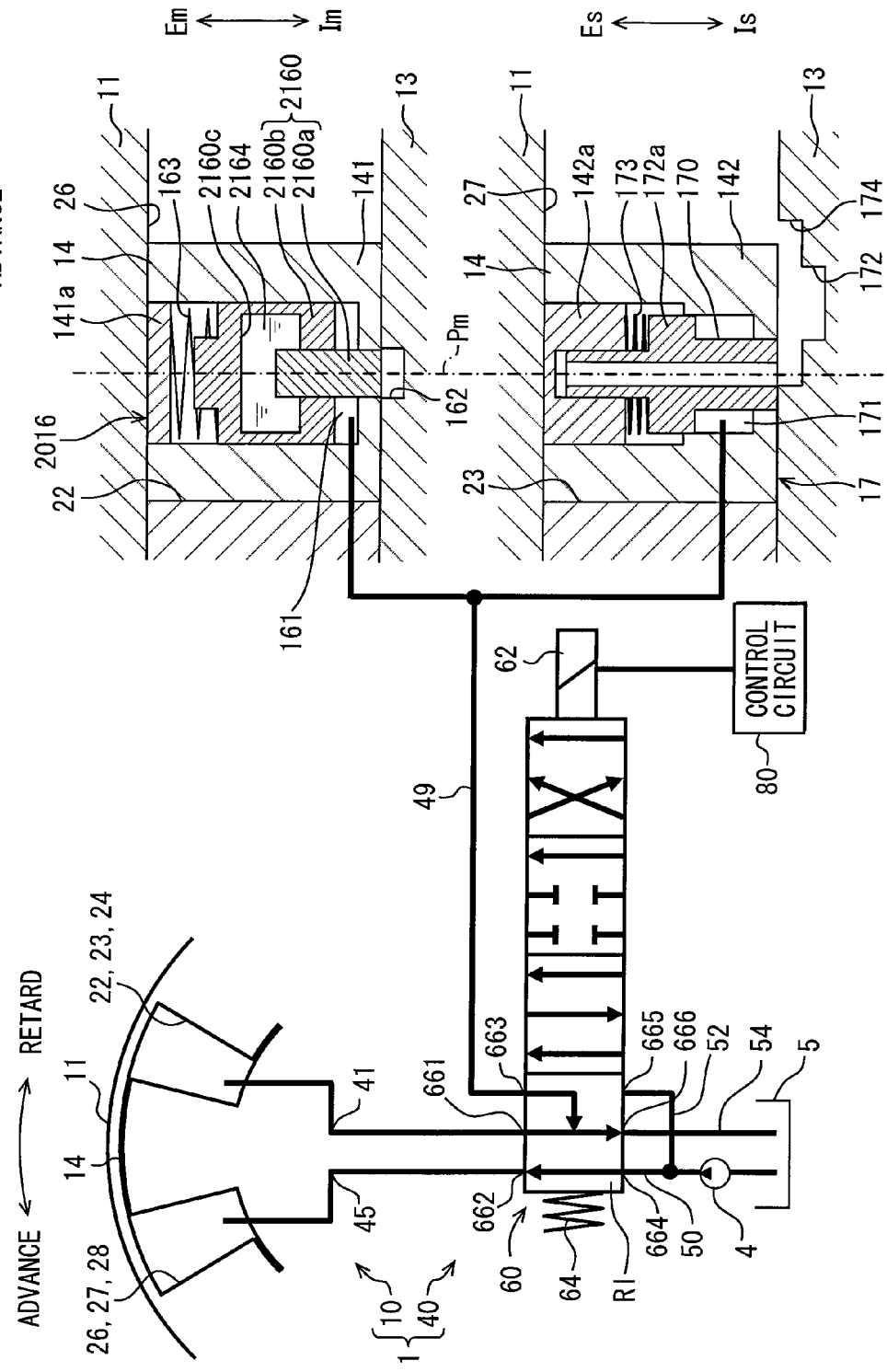
FIG. 16 is an explanatory view illustrating one operation state of the valve timing controller of the second embodiment.
Figure 17:
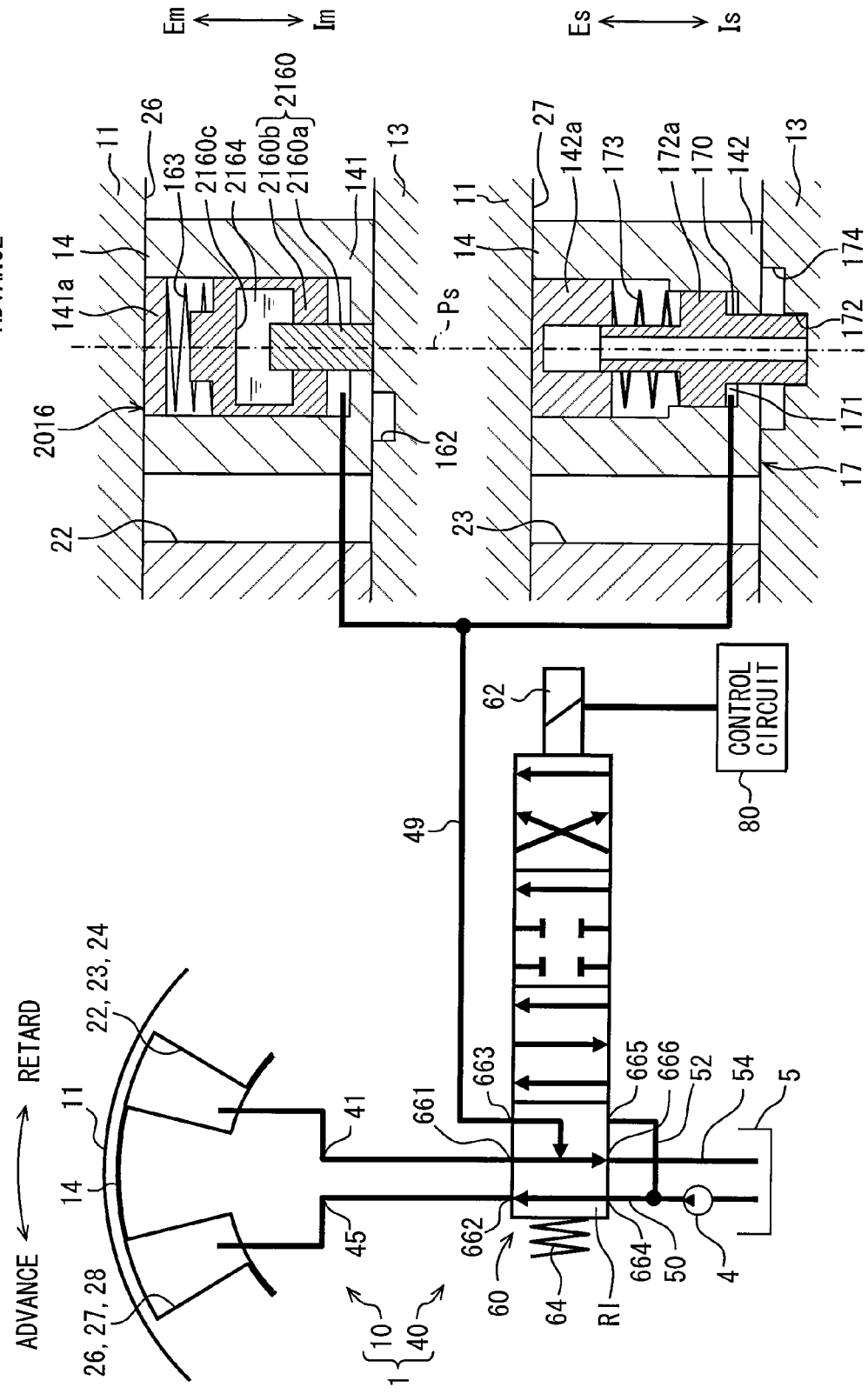
FIG. 17 is an explanatory view illustrating one operation state of the valve timing controller of the second embodiment.

When the ambient temperature is less than the preset temperature T, the volume of the temperature sensing member 2164 is decreased, so the temperature sensing member 2164 is changed to have the second state shown in FIGS. 16 and 17. Therefore, when the pressure disappears in the main unlock chamber 161, the piston 2160a is biased to move in the escape direction Em opposite from the restoring force of the main elastic component 163. At this time, the piston 2160a escapes from the main lock recess 162 in a direction opposite from the restoring force of the main elastic component 163 in the situation where the rotation phase has reached the main lock phase Pm of FIG. 16.

In addition, the preset temperature T of the second embodiment is set in advance at a value such as −10° C. so as to agree with the ambient temperature of the temperature sensing member 2164 in a case where the piston 2160a is changed from the fitting state to the main lock recess 162 to escape from the main lock recess 162 at the main lock phase Pm.

According to the second embodiment, approximately the same operations are conducted as the first embodiment by replacing the temperature sensing member 164, 165 with the temperature sensing member 2164 and by replacing the main lock component 160 with the piston 2160a in (A) to (D) of the first embodiment. Therefore, at the engine startup time, when the ambient temperature is more than or equal to the preset temperature T, the rotation phase which has reached to the main lock phase Pm is locked by the main lock mechanism 2016. In contrast, when the ambient temperature is less than the preset temperature T, the rotation phase is unlocked by the main lock mechanism 2016. Thus, it is possible to start the engine suitably for the environmental temperature by the same principle as the first embodiment.

According to the lock mechanism 2016, 17 of the second embodiment, the piston 2160a and the sun lock component 170 are fitted to or separated from the main lock recess 162 and the sub lock recess 172, respectively, thereby locking or unlocking the rotation phase at the lock phase Pm, Ps. The piston 2160a which is a movable element of the lock mechanism 2016 and the sub lock component 170 which is a movable element of the lock mechanism 17 are allowed to be fitted to the lock recess 162, 172, because the pressure of the working oil disappears at the engine startup time, while the working oil is started to be supplied after the cranking and combustion is completed in the engine.

Furthermore, the piston 2160a and the sub lock component 170 are biased to move in the escape direction Em to escape from the lock recess 162, 172 by receiving the pressure of working oil. Thus, the reliability of the engine startup suitable for the environmental temperature is improved, and it becomes possible to flexibly control the valve timing by controlling the rotation phase.

Furthermore, according to the second embodiment, the main lock component 2160 is constructed by combining the movable cylinder 2160b and the piston 2160a. The temperature sensing member 2164 made of the thermo-wax is liquid-tightly sealed in the internal chamber 2160c of the movable cylinder 2160b into which the piston 2160a moves. Therefore, the main lock component 2160 operates according to the expansion or shrink state of the temperature sensing member 2164 which expands or shrinks following the ambient temperature.

That is, the main lock component 2160 locks the rotation phase at the main lock phase Pm when the piston 2160a which receives the restoring force of the main elastic component 163 is fitted to the main lock recess 162, because the temperature sensing member 2164 is changed to have the first state at the ambient temperature more than or equal to the preset temperature T. On the other hand, at the ambient temperature less than the preset temperature T, the main lock component 2160 unlocks the rotation phase from the main lock phase Pm when the piston 2160a escapes from the main lock recess 162 in a direction opposite from the restoring force of the main elastic component 163 because the temperature sensing member 2164 is changed to have the second state.

Thus, by using the thermo-wax filled in the internal chamber 2160c of the movable cylinder 2160b as the temperature sensing member 2164, the amount of expansion or contraction of the temperature sensing member 2164 is stabilized, therefore the main lock mechanism 2016 can function properly and certainly. Accordingly, it becomes possible to improve the reliability of the engine startup properties suitably for the environmental temperature.

Third Embodiment

Figure 19:
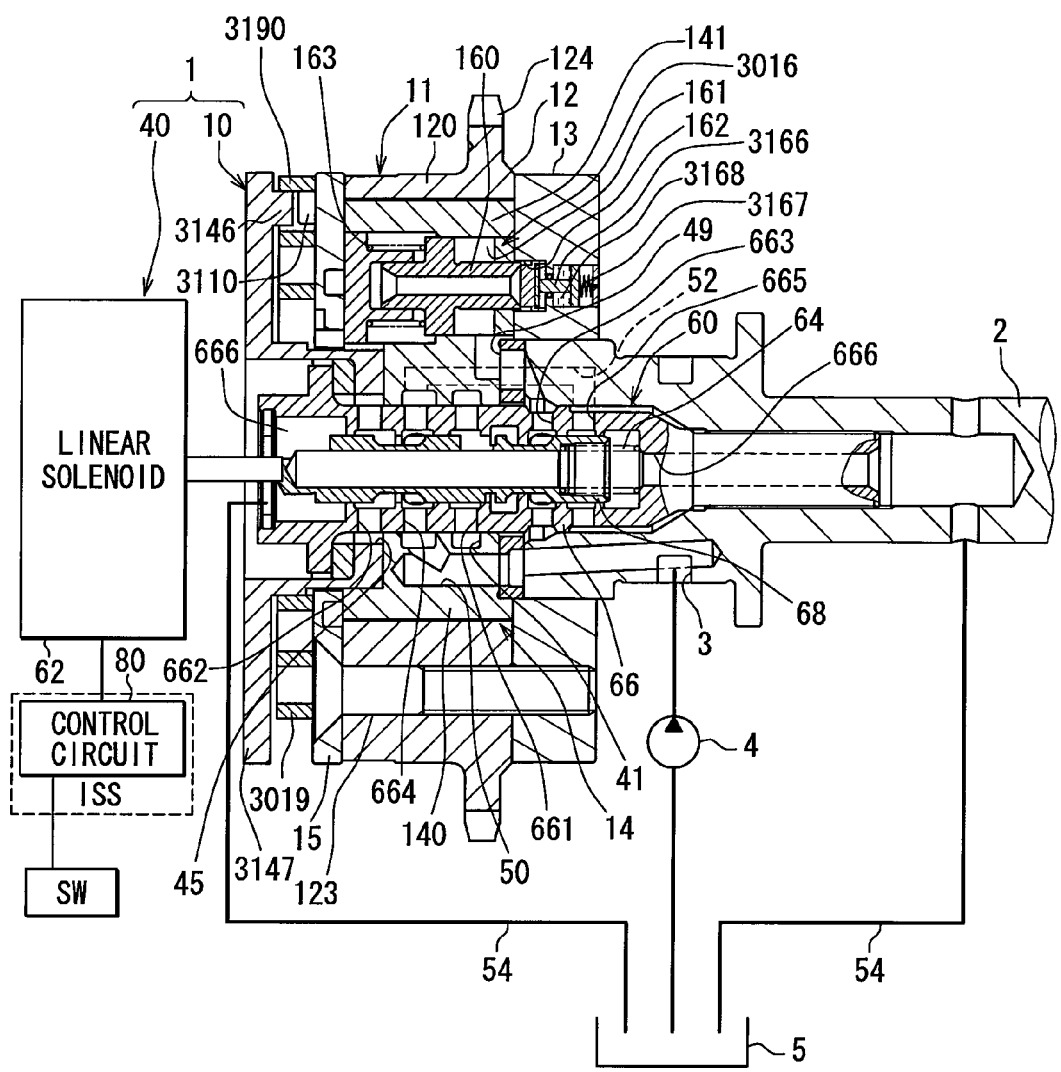
FIG. 19 is a schematic cross-sectional view illustrating a valve timing controller according to a third embodiment.

As shown in FIG. 19, a third embodiment is a modification of the first embodiment. In the third embodiment, the engine is stopped or started by responding to an off-command or on-command output from an engine switch SW, or an idol stop order or restart order output from an idle stop system ISS constructed to include the control circuit 80.

In the third embodiment, as shown in FIG. 19, a biasing structure is added for biasing the vane rotor 14 toward the sub lock phase Ps. Specifically, a first lock pin 3110 is arranged in the housing rotor 11, and a second lock pin 3146 is arranged in the vane rotor 14. The first lock pin 3110 has a pillar shape protruding away from the shoe ring 12 in the axial direction from the front plate 15. The rotary shaft 140 has an arm plate 3147 approximately parallel to the front plate 15, and the second lock pin 3146 has a pillar shape protruding from the arm plate 3147 toward the front plate 15 in the axial direction.

The lock pin 3110, 3146 is located to be distanced from the rotation center of the rotor 11, 14, and the distance between the lock pin 3110 and the rotation center of the housing rotor 11 is approximately the same as the distance between the lock pin 3146 and the rotation center of the vane rotor 14. The positions of the lock pins 3110, 3146 are shifted mutually in the axial direction.

An advance elastic component 3019 is arranged between the front plate 15 and the arm plate 3147. The advance elastic component 3019 may be a swirl spring constructed by coiling a metal element wire in substantially the same plane. The swirl center of the advance elastic component 3019 agrees with the rotation center of the rotors 11 and 14. The inner circumference side end of the advance elastic component 3019 is windingly mounted to the outer peripheral part of the rotary shaft 140. The outer circumference side end of the advance elastic component 3019 is crooked in the U-shape to define a locking part 3190. The locking part 3190 can be locked by the lock pin 3110 or the lock pin 3146 depending on the rotation phase.

When the rotation phase is changed on the retard side rather than the sub lock phase Ps, that is, when the rotation phase is located between the sub lock phase Ps and the main lock phase Pm, the locking part 3190 of the advance elastic component 3019 is locked by the first lock pin 3110. At this time, because the second lock pin 3146 separates from the locking part 3190, the restoring force of the advance elastic component 3019 generated by torsional resilience deformation acts on the vane rotor 14 as a rotating torque applied on the advance side with respect to the housing rotor 11. That is, the vane rotor 14 is biased toward the sub lock phase Ps on the advance side.

Here, the restoring force of the advance elastic component 3019 is set to be larger than the average value (refer to FIG. 9 explained in the first embodiment) of the variation torque deviated on the retard side, between the sub lock phase Ps and the main lock phase Pm. On the other hand, when the rotation phase has changed to the advance side rather than the sub lock phase Ps, the locking part 3190 is locked by the second lock pin 3146. At this time, because the first lock pin 3110 separates from the locking part 3190, the biasing action of the advance elastic component 3019 with respect to the vane rotor 14 will be restricted.

As shown in FIG. 19, the main lock mechanism 3016 of the third embodiment further includes a movable body 3166, a control elastic component 3167, and a temperature sensing member 3168.

As shown in FIGS. 20-23, the movable body 3166 has a movable piston 3164 and a movable bottom portion 3165. The movable piston 3164 is made of metal and has a cylindrical shape. The main lock recess 162 has a large diameter part 162a and a small diameter part 162b. A diameter of the large diameter part 162a is larger than a diameter of the small diameter part 162b. The large diameter part 162a is located adjacent to the vane rotor 14 than the small diameter part 162b is. The movable piston 3164 is coaxially accommodated in the main lock recess 162, and extends between the large diameter part 162a and the small diameter part 162b.

The movable piston 3164 has a first flange 3164a located in the large diameter part 162a and a second flange 3164b located in the small diameter part 162b. The first flange 3164a and the second flange 3164b are arranged on axial ends of the movable piston 3164, respectively, and the diameter of the flange 3164a, 3164b is larger than the diameter of the intermediate part of the movable piston 3164. The first flange 3164a is located adjacent to the vane rotor 14 than the second flange 3164b is. The first flange 3164a adjacent to the vane rotor 14 is movably inserted in the large diameter part 162a, and the second flange 3164b opposite from the vane rotor 14 is fittingly inserted in the small diameter part 162b.

The movable bottom portion 3165 is made of metal, and has a large diameter part 3165a and a small diameter part 3165b. The small diameter part 3165b is located adjacent to the vane rotor 14 than the large diameter part 3165a is. Each of the large diameter part 3165a and the small diameter part 3165b of the movable bottom portion 3165 is coaxially accommodated in the large diameter part 162a. The large diameter part 3165a of the movable bottom portion 3165 is fittingly inserted in the large diameter part 162a, and the small diameter part 3165b of the movable bottom portion 3165 is movably inserted in the large diameter part 162a. Moreover, the large diameter part 3165a has a recess recessed toward the vane rotor 14, and the first flange 3164a is inserted into the recess of the large diameter part 3165a. Therefore, in the main lock recess 162, the movable bottom portion 3165 and the movable piston 3164 are integrally reciprocatable in the axial direction.

Figure 21:
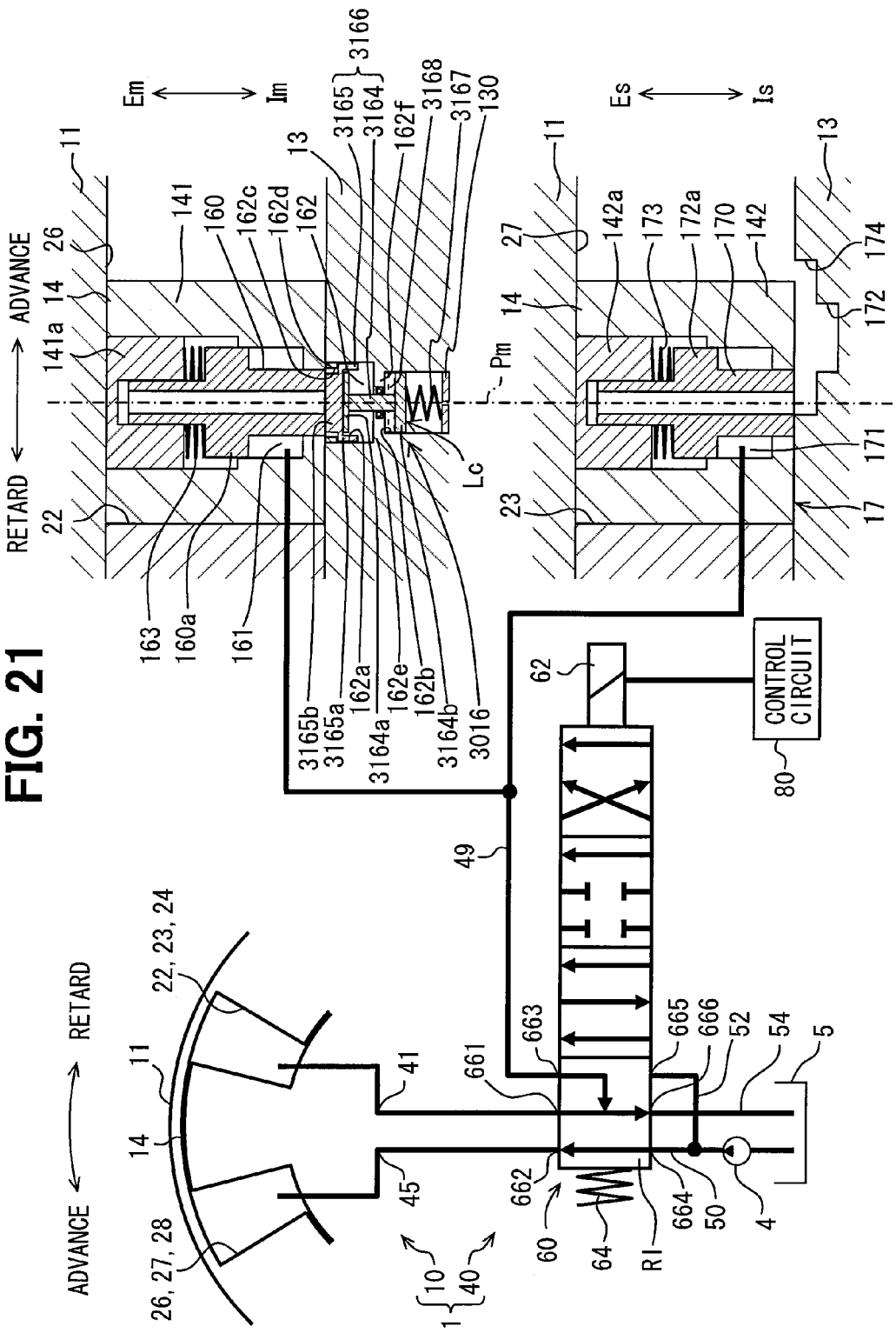
FIG. 21 is an explanatory view illustrating one operation state of the valve timing controller of the third embodiment.
Figure 22:
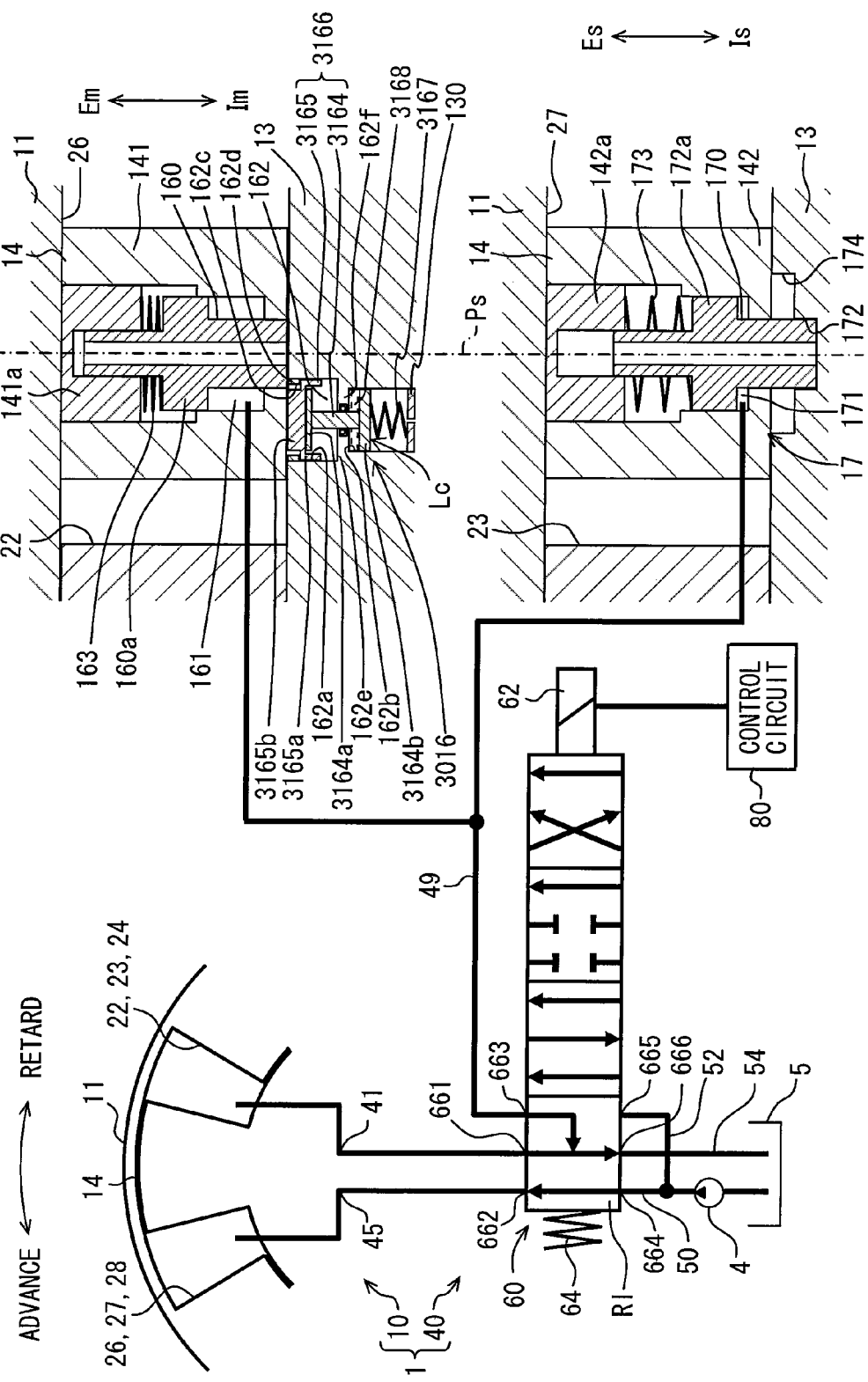
FIG. 22 is an explanatory view illustrating one operation state of the valve timing controller of the third embodiment.

As shown in FIGS. 21 and 22, when the movable body 3166 moves to a close position Lc, the movable body 3166 approximately closes an opening 162c of the large diameter part 162a adjacent to the vane rotor 14 (namely, opposite from the small diameter part 162b). In this case, at the main lock phase Pm shown in FIG. 21, the main lock component 160 is restricted from being fitted to the main lock recess 162, that is, the rotation phase is unlocked. At this time, according to the third embodiment, the large diameter part 3165a of the movable bottom portion 3165 is stopped by a stopper part 162*d* arranged in the large diameter part 162*a* of the main lock recess 162.

Figure 20:
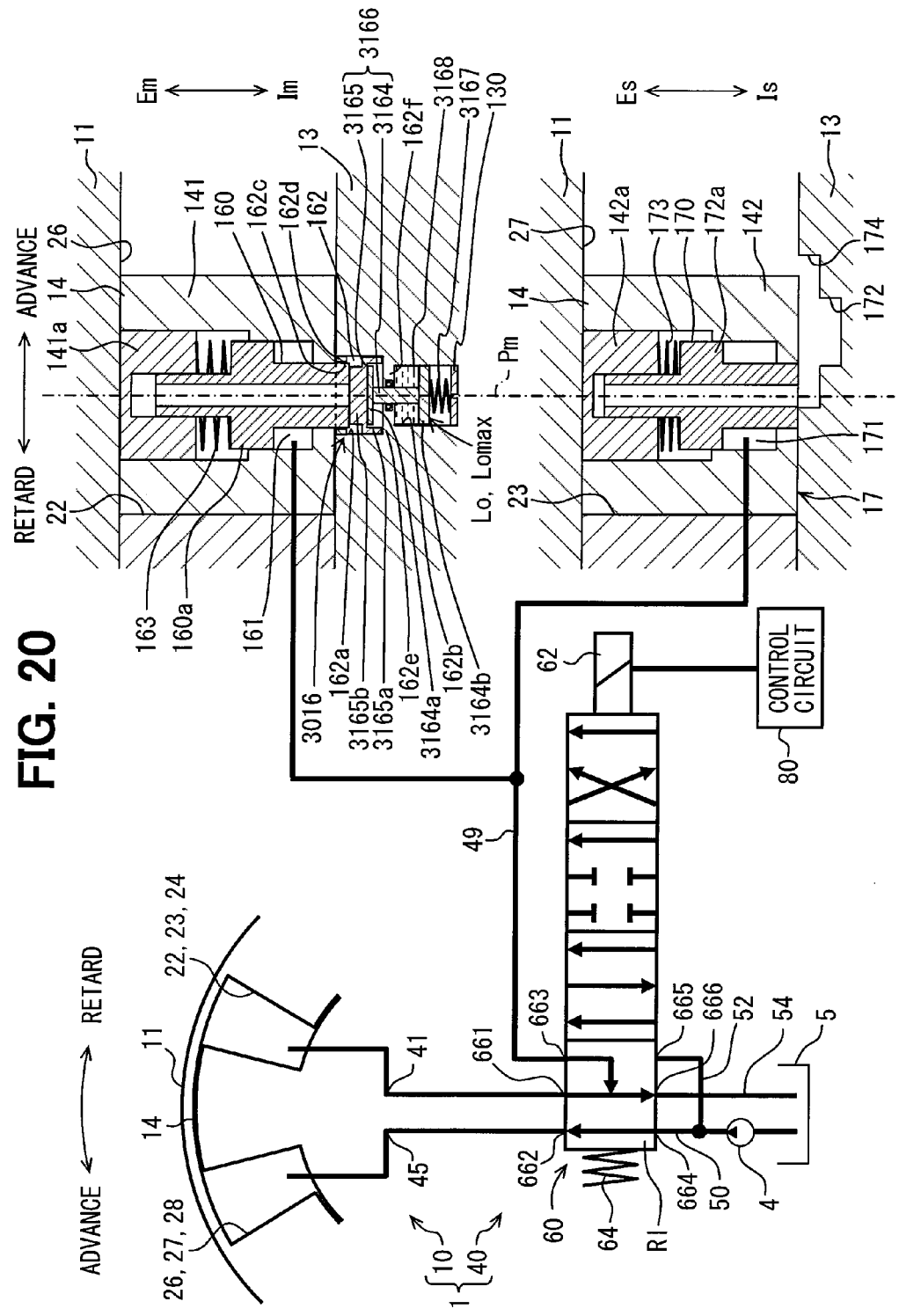
FIG. 20 is an explanatory view illustrating one operation state of the valve timing controller of the third embodiment.
Figure 23:
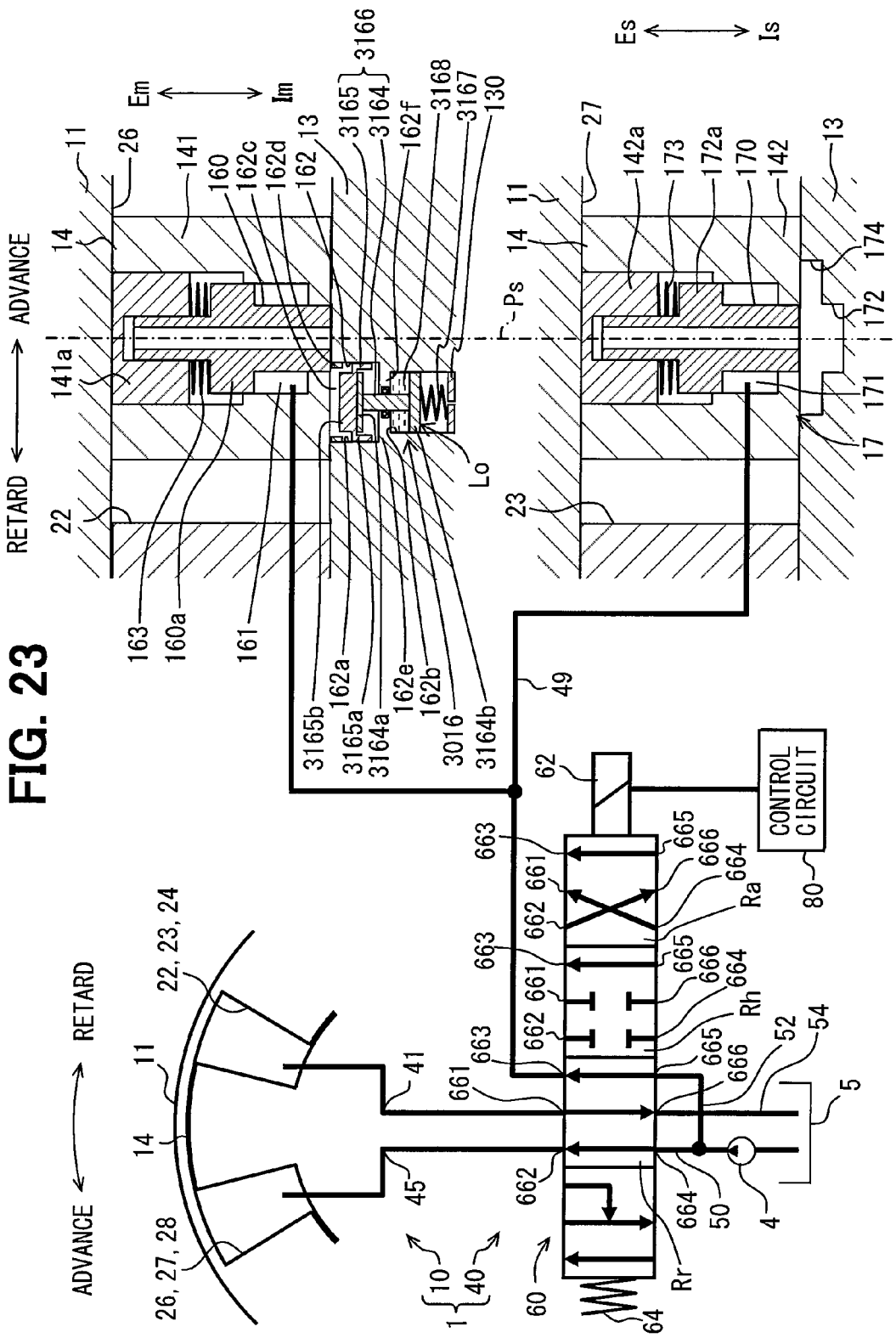
FIG. 23 is an explanatory view illustrating one operation state of the valve timing controller of the third embodiment.

In contrast, as shown in FIGS. 20 and 23, when the movable body 3166 moves to an open position Lo opposite from the close position Lc with respect to the vane rotor 14, (namely, adjacent to the small diameter part 162*b*), the opening 162*c* is opened. Thus, at the main lock phase Pm shown in FIG. 20, the main lock component 160 is allowed to be fitted to the main lock recess 162, so the rotation phase is allowed to be locked. In the third embodiment, when the movable body 3166 moves to the maximum opening position Lomax of FIG. 20, at which the opening 162*c* is most widely opened in the open position Lo, the large diameter part 3165*a* is stopped by a stopper part 162*e* defined in the large diameter part 162*a* of the main lock recess 162.

As shown in FIGS. 20-23, the control elastic component 3167 may be a metal coil spring, and is accommodated in the small diameter part 162*b*. The control elastic component 3167 is interposed between a spring receiver 130 of the rear plate 13 and the second flange 3164*b* located in the small diameter part 162*b* in the axial direction. Thus, restoring force is generated by the control elastic component 3167 to bias each of the movable piston 3164 and the movable bottom portion 3165 of the movable body 3166 toward the vane rotor 14 in the axial direction.

Therefore, at the main lock phase Pm shown in FIGS. 20 and 21, when the main lock component 160 and the movable bottom portion 3165 of the movable body 3166 contact with each other, the restoring force of the control elastic component 3167 works as a biasing force applied toward the main lock component 160 in the escape direction Em against the restoring force of the main elastic component 163 applied toward the movable body 3166 in the fitting direction Im.

As shown in FIGS. 20-23, the temperature sensing member 3168 is made of liquid-state non-compression thermo-wax, which has the expansion and shrink characteristics following to the ambient temperature. The temperature sensing member 3168 is liquid-tightly sealed between a partition component 162*f* and the second flange 3164*b*. The partition component 162*f* is defined between the small diameter part 162*b* and the large diameter part 162*a*. The second flange 3164*b* is arranged in the small diameter part 162*b* opposite from the vane rotor 14 with respect to the partition component 162*f*.

The temperature sensing member 3168 controls the reciprocation of the movable body 3166 by expanding and contracting according to the ambient temperature of the temperature sensing member 3168 corresponding to the environmental temperature. Specifically, when the ambient temperature is more than or equal to the preset temperature T (refer to FIGS. 24-27 to be explained in detail), the temperature sensing member 3168 has the first state by the increase of the volume, thereby raising the internal pressure more than a fixed value.

As a result, the movable body 3166 which receives the internal pressure from the temperature sensing member 3168 contacts the main lock component 160 which receives the restoring force of the main elastic component 163 at the main lock phase Pm of FIG. 20. Meanwhile, the movable body 3166 can be driven to the open position Lo against the restoring force of the control elastic component 3167. Moreover, at this time, because the movable body 3166 is moved to the open position Lo opposite from the main lock component 160, the main lock recess 162 is opened. Therefore, as shown in FIG. 20, the main lock component 160 which receives the restoring force of the main elastic component 163 becomes possible to be fitted to the recess 162.

On the other hand, when the ambient temperature is less than the preset temperature T, the temperature sensing member 3168 is changed to have the second state by the decrease in the volume, thereby reducing the internal pressure to less than the fixed value. As a result, the movable body 3166 which receives the internal pressure from the temperature sensing member 3168 contacts with the main lock component 160 which receives the restoring force of the main elastic component 163 at the main lock phase Pm of FIG. 21. Meanwhile, the movable body 3166 is driven to the close position Lc against the restoring force.

Moreover, at this time, the movable body 3166 which moved to the close position Lc adjacent to the main lock component 160 closes the main lock recess 162. Therefore, as shown in FIG. 21, the main lock component 160 is pushed out of the recess 162 against the restoring force of the main elastic component 163. In addition, the preset temperature T of this embodiment is set in advance at a predetermined value such as −10° C. so as to agree with the ambient temperature of the temperature sensing member 3168 when the main lock component 160 escapes from the main lock recess 162 at the main lock phase Pm, that is, when the movable body 3166 is switched from the open position Lo to the close position Lc.

Operations of the valve timing controller of the third embodiment are explained.

(A) Normal Operation

Figure 24:
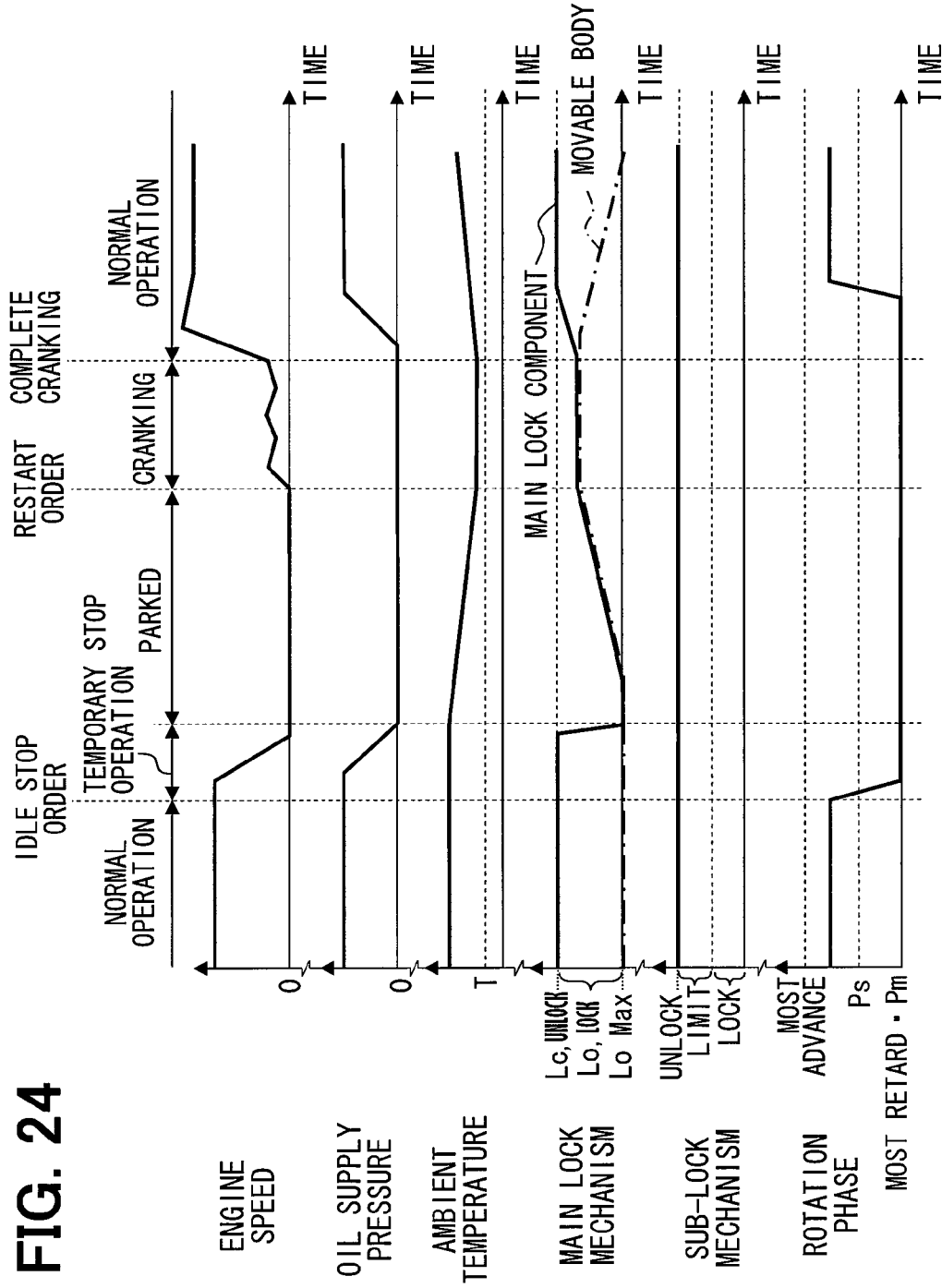
FIG. 24 is a time chart illustrating characteristics of one operation state of the valve timing controller of the third embodiment.
Figure 25:
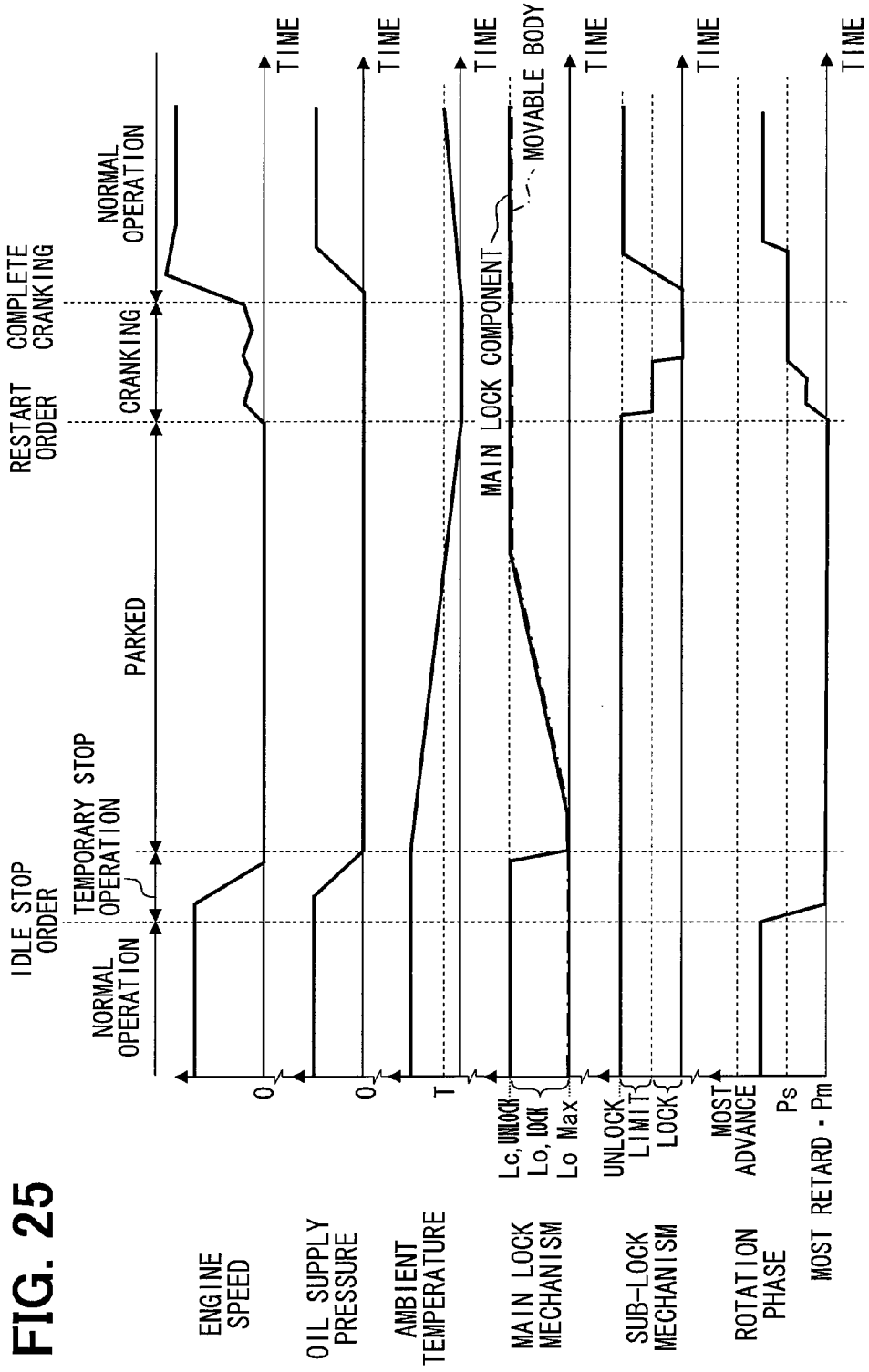
FIG. 25 is a time chart illustrating characteristics of one operation state of the valve timing controller of the third embodiment.
Figure 26:
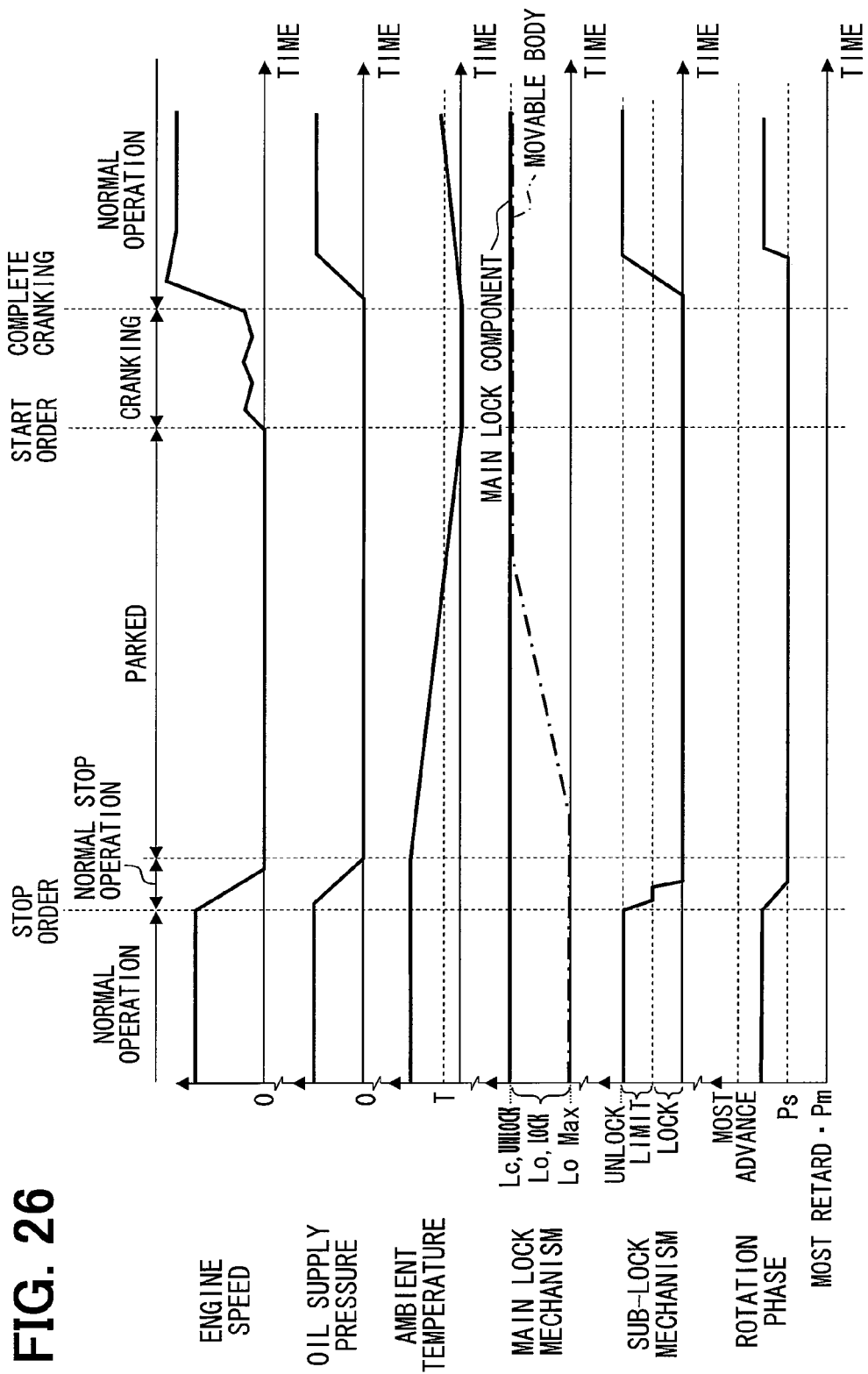
FIG. 26 is a time chart illustrating characteristics of one operation state of the valve timing controller of the third embodiment.

When the engine is in the normal operation, as shown in FIGS. 24-26, the supplying of the working oil from the pump 4 is continued with the pressure according to the rotating speed of the engine. As a result, each of the lock components 160, 170 is biased in the escape direction Em, Es by the pressure of the working oil introduced to the unlock chamber 161, 171. Thus, as shown in FIG. 23, the rotation phase is unlocked from the lock phase Pm, Ps. Here, the rotation phase is unlocked from the main lock phase Pm by the pressure of working oil irrespective of the position of the movable body 3166. The valve timing is suitably adjusted by the change in the position of the spool 68 among the ranges Rr, Ra, Rh.

(B) Idol Stop Operation and Re-Start Operation

When the engine is idly stopped by an idle stop order of the idle stop system ISS, as shown in FIGS. 24 and 25, the spool 68 is moved to the lock range Rl before the engine is made to have an inertia rotating state by fuel cut. At this time, the supplying of the working oil from the pump 4 is continued with high pressure according to the rotating speed of the engine. Therefore, the rotation phase is changed to the main lock phase Pm (the most retard phase) with the pressure of working oil in the retard chambers 26, 27, 28.

After the rotation phase is changed to the main lock phase Pm, if the engine is made to have the inertia rotating state, the supply pressure of the working oil from the pump 4 will decrease gradually according to the velocity of the inertia rotation, as shown in FIGS. 24 and 25. At this time, the pressure disappears in the main unlock chamber 161, and the main lock component 160 which receives the restoring force of the main elastic component 163 contacts to the movable body 3166 which receives the restoring force of the control elastic component 3167 (FIGS. 20 and 21). Moreover, at this time, the sub lock component 170 which receives the restoring force of the sub elastic component 173 contacts the rear plate 13 outside of the sub lock recess 172 and the limit groove 174 (FIGS. 20 and 21) while the pressure disappears in the sub unlock chamber 171. Thus, the engine is temporally stopped at the main lock phase Pm.

During the stop of the engine by the idle stop system ISS, as shown in FIG. 24, when the ambient temperature is more than or equal to the preset temperature T, the movable body 3166 is driven toward the close position Lc by the temperature sensing member 3168 in the first state in accordance with but slightly late from the change in the ambient temperature, in the range of the open position Lo. The rotation phase is locked at the main lock phase Pm because the main lock component 160 is fitted to the main lock recess 162 which is in the open state.

While the rotation phase is locked at the ambient temperature more than or equal to the preset temperature T shown in FIG. 24, when the engine is re-started to start the cranking according to the re-start order of the idle stop system ISS, the movable body 3166 is located in the open position Lo. At this time, the position of the spool 68 is held in the lock range RI, and the working oil is not supplied from the pump 4. Therefore, the main lock component 160 which receives the restoring force of the main elastic component 163 maintains to be fitted to the main lock recess 162 opened widely (FIG. 20) while the pressure disappears in the main unlock chamber 161.

Furthermore, the sub lock component 170 which receives the restoring force of the sub elastic component 173 contacts the rear plate 13 outside of the sub lock recess 172 and the limit groove 174 (FIG. 20) while the pressure disappears in the sub unlock chamber 171. Accordingly, the engine will complete the combustion in the state where the rotation phase has been locked at the main lock phase Pm.

If the ambient temperature is lowered to less than the preset temperature T, as shown in FIG. 25, during the stop of the engine by the idle stop system ISS, the movable body 3166 is driven toward the close position Lc because the temperature sensing member 3168 becomes in the second state by the contracting (FIG. 21). Thereby, the main lock recess 162 is closed, and the main lock component 160 escapes from the main lock recess 162, thereby unlocking the rotation phase from the main lock phase Pm.

When the engine is re-started by starting the cranking according to the re-start order of the idle stop system ISS while the rotation phase is unlocked at the ambient temperature less than the preset temperature T, as shown in FIG. 25, the movable body 3166 is made to stay at the close position Lc. At this time, the position of the spool 68 is held in the lock range RI, and the working oil is not supplied from the pump 4. Therefore, the main lock component 160 which receives the restoring force of the main elastic component 163 contacts the movable body 3166 which receives the restoring force of the control elastic component 3167, and maintains to be escaped from the main lock recess 162 (FIG. 21) while the pressure disappears in the main unlock chamber 161.

When the vane rotor 14 is unlocked from the main lock phase Pm, the vane rotor 14 rotates on the advance side relative to the housing rotor 11 by the negative torque, and the rotation phase is advanced from the main lock phase Pm. As a result, the sub lock component 170 which receives the restoring force of the sub elastic component 173 enters the limit groove 174 at first while the pressure disappears in the sub unlock chamber 171. Thereby, as shown in FIG. 25, even if the vane rotor 14 is rotated on the retard side relative to the housing rotor 11 by the positive torque, the rotation phase is restricted from returning to the main lock phase Pm.

Thereafter, if the rotation phase is further advanced by the negative torque and reaches the sub lock phase Ps, the sub lock component 170 which receives the restoring force of the sub elastic component 173 is fitted to the sub lock recess 172 (FIG. 22) while the pressure disappears in the sub unlock chamber 171. Moreover, at this time, the main lock component 160 which receives the restoring force of the main elastic component 163 contacts the rear plate 13 outside of the main lock recess 162 (FIG. 22) while the pressure disappears in the main unlock chamber 161. Thus, as shown in FIG. 25, the engine will complete the combustion in the state where the rotation phase has been locked at the sub lock phase Ps.

(C) Normal Stop Operation and Normal Start Operation

When the engine is stopped according to an off-command of the engine switch SW, as shown in FIG. 26, the engine is made to have the inertia rotating state by fuel cut, thereby gradually decreasing the supply pressure of the working oil from the pump 4 according to the velocity of the inertia rotation. Thereafter, because the supply pressure of working oil is comparatively high, the rotation phase is unlocked from the lock phase Pm, Ps by the same principle as the above (A). Meanwhile, the spool 68 is moved to the lock range RI. As a result, the rotation phase reaches the sub lock phase Ps as an intermediate phase by balance among the pressure of working oil in the retard chambers 26, 27, 28, the restoring force of the advance elastic component 3019 which acts on the advance side, and the variation torque deviated on the retard side.

After reaching the sub lock phase Ps, as shown in FIG. 26, if the pressure disappears in the sub unlock chamber 171 by the decrease in the inertia rotating speed of the engine, the sub lock component 170 which receives the restoring force of the sub elastic component 173 will be fitted to the sub lock recess 172 (FIG. 22). Moreover, at this time, the main lock component 160 which receives the restoring force of the main elastic component 163 contacts the rear plate 13 outside of the main lock recess 162 (FIG. 22) while the pressure disappears in the main unlock chamber 161. Thus, the rotation phase is locked at the sub lock phase Ps.

Thereafter, when the engine is normally started, as shown in FIG. 26, by starting the cranking according to an on-command of the engine switch SW, the position of the spool 68 is held in the lock range RI, and the working oil is not supplied from the pump 4. Thereby, the sub lock component 170 which receives the restoring force of the sub elastic component 173 maintains to be fitted to the sub lock recess 172 (FIG. 22) while the pressure disappears in the sub unlock chamber 171. Moreover, at this time, the main lock component 160 which receives the restoring force of the main elastic component 163 maintains to contact with the rear plate 13 outside of the main lock recess 162 (FIG. 22) while the pressure disappears in the main unlock chamber 161. Thus, the engine will complete the combustion in the state where the rotation phase has been locked at the sub lock phase Ps.

Operations and advantage of the third embodiment will be described.

Figure 27:
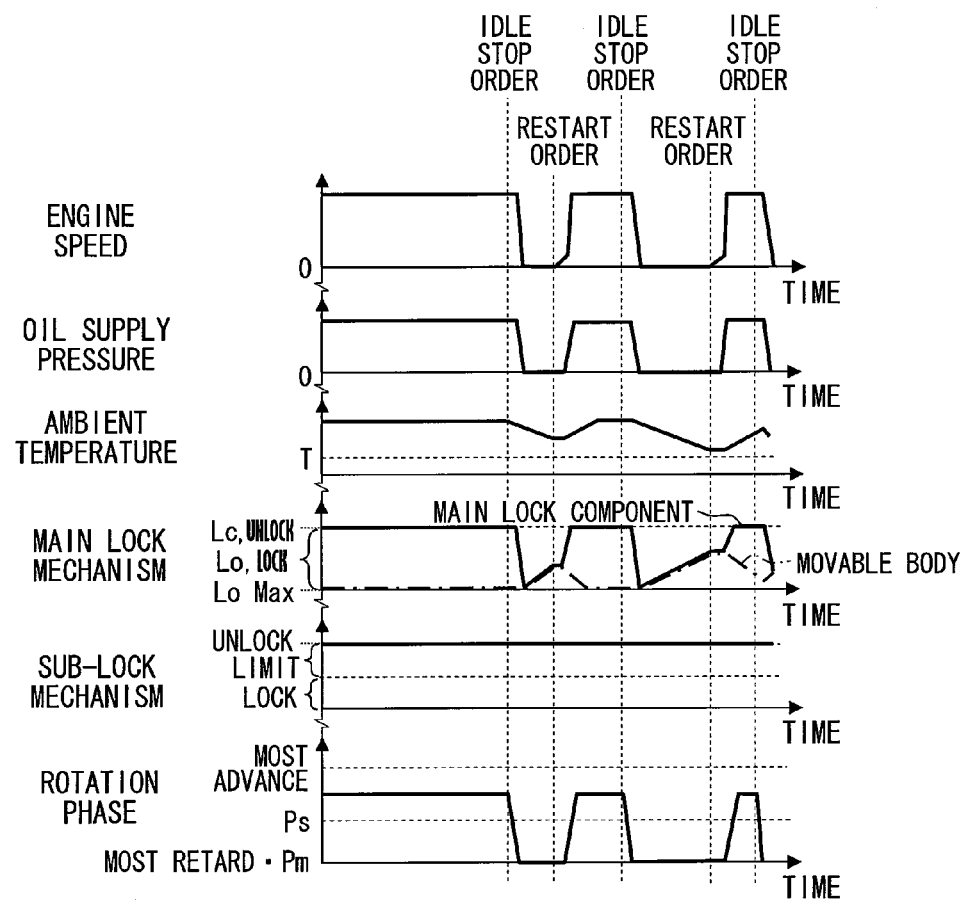
FIG. 27 is a time chart illustrating advantage of the valve timing controller of the third embodiment.

According to the third embodiment, in a case where the engine is started with the ambient temperature more than or equal to the preset temperature T, for example, even when the re-start by the idle stop system ISS is frequently repeated as shown in FIG. 27, knocking, pre-ignition and unpleasant vibration or noise can be restricted, because the movable body 3166 is driven within the range of the open position Lo.

Further, according to the third embodiment, if the engine is started with the ambient temperature less than the preset temperature T, for example, when the engine is restarted after the engine is stopped following the temporal stop state, ignition-ability is raised to secure the startup properties by the same principle as the first embodiment.

Furthermore, according to the third embodiment, the internal pressure of the thermo-wax is raised by the expanding, because the temperature sensing member 3168 is in the first state, when the ambient temperature becomes more than or equal to the preset temperature T. The internal pressure is raised to a pressure required for driving the movable body 3166 to the open position Lo opposite from the main lock component 160 at the main lock phase Pm.

Therefore, at the main lock phase Pm, the movable body 3166 moves to the open position Lo against the restoring force of the control elastic component 3167 in the state where the main lock component 160 and the movable body 3166 are contact with each other, while the main lock component 160 and the movable body 3166 are biased by the main elastic component 163 and the control elastic component 3167, respectively. As a result, the main lock component 160 can be fitted to the main lock recess 162 which is in the open state.

In contrast, the internal pressure of the thermo-wax is lowered by the contraction, because the temperature sensing member 3168 is in the second state, when the ambient temperature becomes less than the preset temperature T. The internal pressure is lowered to a pressure required for driving the movable body 3166 to the close position Lc adjacent to the main lock component 160, at the main lock phase Pm.

Therefore, at the main lock phase Pm, the movable body 3166 moves to the close position Lc against the restoring force of the main elastic component 163 in the state where the main lock component 160 and the movable body 3166 are contact with each other, while the main lock component 160 and the movable body 3166 are biased by the main elastic component 163 and the control elastic component 3167, respectively. As a result, the main lock component 160 is extruded from the main lock recess 162 which is in the close state.

According to the temperature sensing member 3168 made of the thermo-wax, the rotation phase is allowed to be locked by opening the main lock recess 162, and the rotation phase is unlocked by closing the main lock recess 162. The locking and the unlocking are suitably switched from each other according to the environmental temperature which determines the ambient temperature of the temperature sensing member 3168. Thus, it becomes possible to improve the reliability of the startup properties suitably for the environmental temperature.

In addition, according to the third embodiment, the vane rotor 14 is biased by the advance elastic component 3019 on the advance side with respect to the housing rotor 11 at a rotation phase between the main lock phase Pm and the sub lock phase Ps. The vane rotor 14 receives the biasing force of the advance elastic component 3019 at the engine startup time under a low temperature environment less than the preset temperature T. Therefore, the rotation phase of the vane rotor 14 with respect to the housing rotor 11 can be quickly made to reach the sub lock phase Ps, together with the variation torque. Thus, a time period taken for locking the rotation phase at the sub lock phase Ps from the start of the cranking which generates the variation torque in the engine can be shortened at the engine startup time. Accordingly, it becomes possible to improve the start-up reliability under the low temperature environment suitably for the environmental temperature.

Fourth Embodiment

Figure 28:
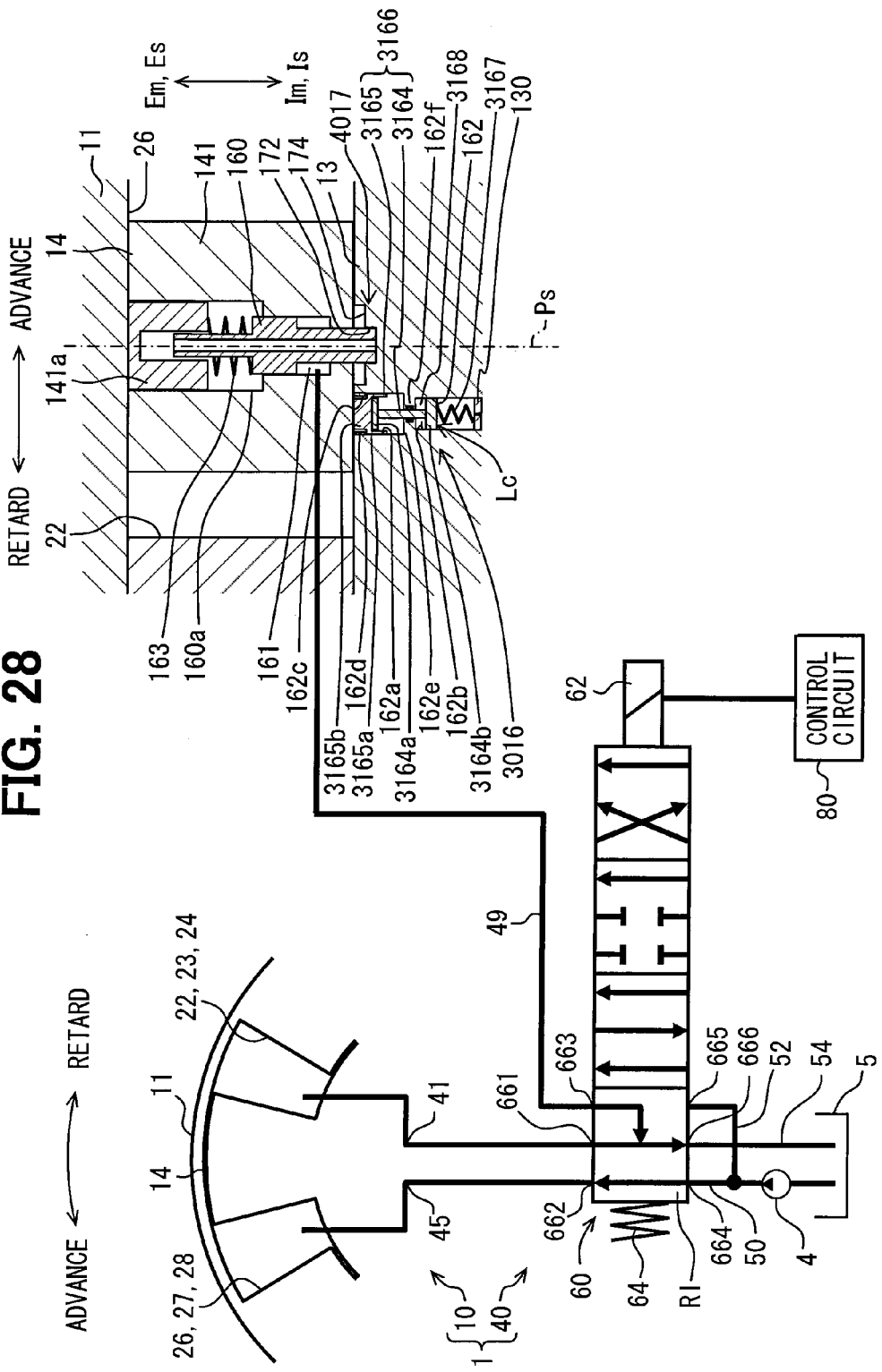
FIG. 28 is an explanatory view illustrating one operation state of a valve timing controller according to a fourth embodiment.

As shown in FIG. 28, a fourth embodiment is a modification of the third embodiment.

The sub lock component 170, the sub unlock chamber 171, and the sub elastic component 173 are eliminated in a sub lock mechanism 4017 of the fourth embodiment. Instead, the main lock component 160 of the main lock mechanism 3016 achieves the function of the sub lock component.

Specifically, at the sub lock phase Ps shown in FIG. 28, the restoring force of the main elastic component 163 works as a biasing force which biases the main lock component 160 toward the sub lock recess 172 in the fitting direction Is. Moreover, at the sub lock phase Ps, against the restoring force of the main elastic component 163, the driving force generated by the pressure in the main unlock chamber 161 drives the main lock component 160 to escape from the sub lock recess 172 in the escape direction Es.

Furthermore, when the main lock component 160 enters the limit groove 174 defined on both sides of the sub lock recess 172 in the rotation direction, the rotation phase is restricted to be located in a range of the rotation phase defined on both sides of the sub lock phase Ps. Furthermore, the rotation phase is locked at the sub lock phase Ps when the rotation phase reaches the sub lock phase Ps, in a case where the main lock component 160 is fitted to the sub lock recess 172 from the limit groove 174.

In the fourth embodiment, approximately the same operations are conducted by replacing the sub lock component 170 in the third embodiment with the main lock component 160. The fourth embodiment has substantially the same advantages as the third embodiment.

Moreover, according to the fourth embodiment, the main lock component 160 which locks the rotation phase by fitting to the main lock recess 162 at the main lock phase Pm functions also as a sub lock component which locks the rotation phase by fitting to the sub lock recess 172 at the sub lock phase Ps. Therefore, the startup properties can be secured suitably for the environmental temperature, with a simple structure by reducing the number of components required for changing the lock phase.

Other Embodiments

The present disclosure should not be limited to the embodiments, but may be implemented in other ways without departing from the sprit of the present disclosure.

In a first modification example relative to the first to fourth embodiments, the main lock phase Pm may be set on the advance side rather than the most retard phase, when the intake valve 9 is closed after the piston 8 reaches the bottom dead center BDC in the cylinder 7 of the engine.

In a second modification example relative to the first to fourth embodiments, the lock recess 162, 172 may be defined in the vane rotor 14 instead of the housing rotor 11. In this case, the lock component 160, 170, 2160 (the piston 2160a and the movable cylinder 2160b) is supported by the housing rotor 11 as a support rotor.

In a third modification example relative to the first to fourth embodiments, the elastic component 163, 173, 3167 may be made of rubber component or metal spring instead of the coil spring.

In a fourth modification example relative to the first to fourth embodiments, the pump 4 may be an electric pump which can start supplying working oil at arbitrary timing or in accordance with the complete combustion in the engine.

In a fifth modification example relative to the first embodiment, only one temperature sensing member 165 may be adopted and may be located in a manner that the inner circumference part of the temperature sensing member 165 is arranged to contact to or separated from the spring receiver 160a of the main lock component 160.

Figure 29:
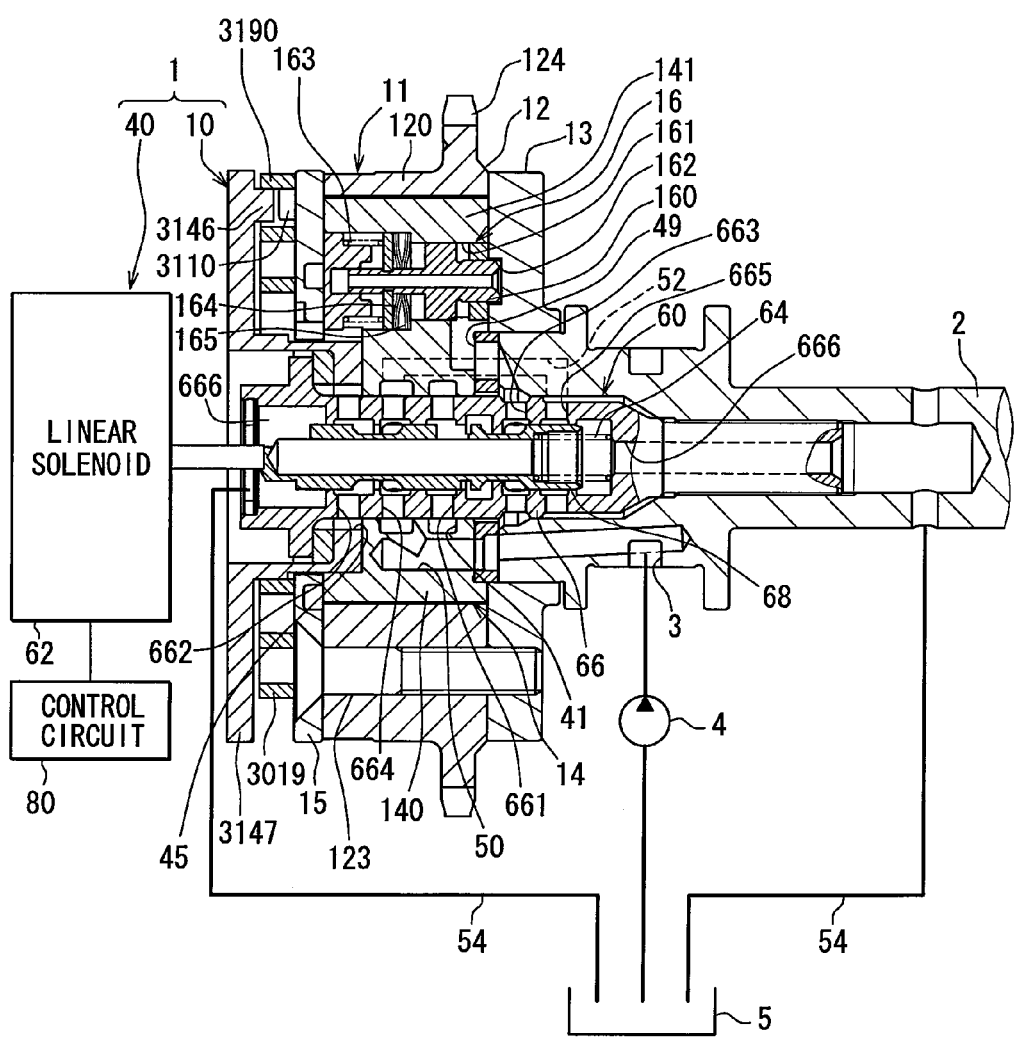
FIG. 29 is a schematic cross-sectional view illustrating a modification example of the valve timing controller of the first embodiment.

In a sixth modification example relative to the first and second embodiments, as shown in FIG. 29, similarly to the third embodiment, the advance elastic component 3019 may be adopted (FIG. 29 represents the sixth modification example relative to the first embodiment). In the sixth modification example, the spool 68 is moved to the lock range Rl before the engine becomes to have the inertia rotating state, according to the operation (B) of the third embodiment.

Figure 30:
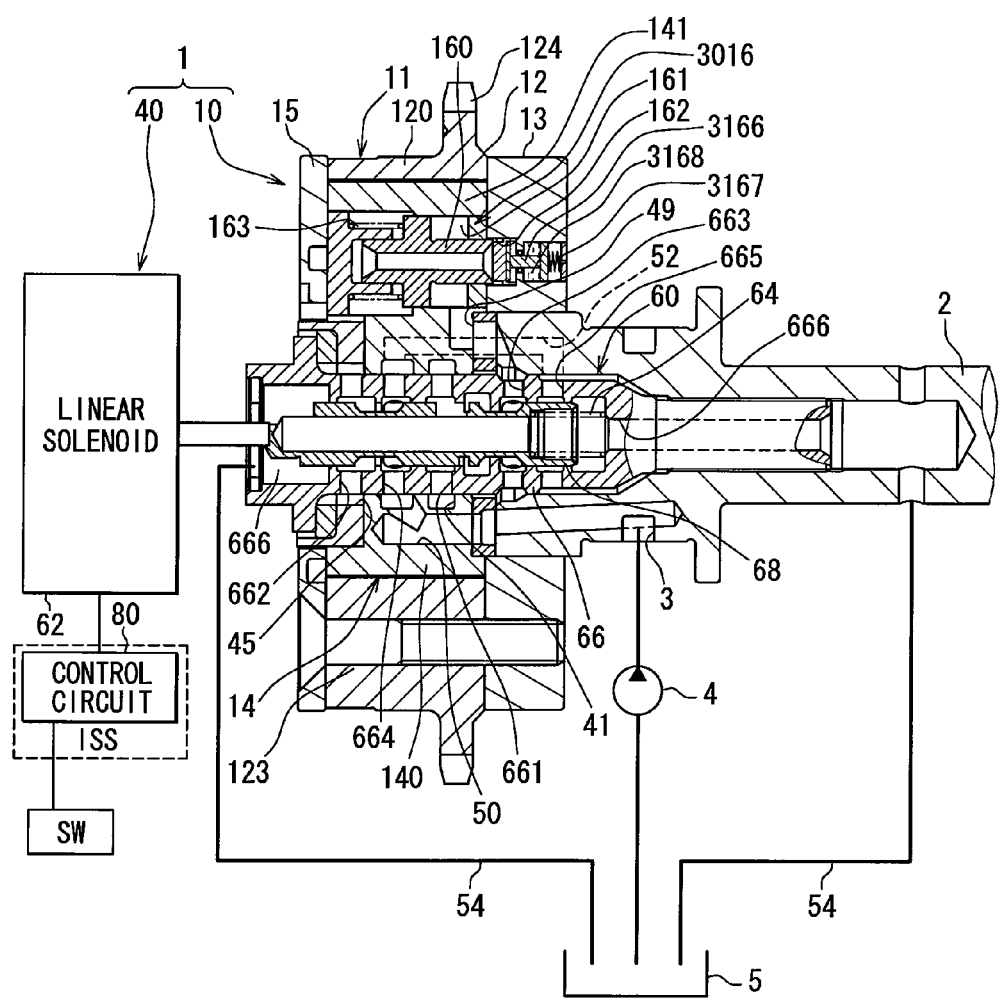
FIG. 30 is a schematic cross-sectional view illustrating a modification example of the valve timing controller of the third embodiment.

In a seventh modification example relative to the third and fourth embodiments, as shown in FIG. 30, the advance elastic component 3019 may be eliminated (FIG. 30 represents the seventh modification example relative to the first embodiment). In this case, the order of performing the movement of the spool 68 to the lock range RI and the engine inertia rotation is made opposite between the idle stop time and the normal stop time.

In an eighth modification example relative to the first and the second embodiments, operation may be made different between the idol stop time and the normal stop time according to the operations (B) and (C) of the third embodiment.

In a ninth modification example relative to the third and fourth embodiments, approximately the same operation may be conducted at the normal stop time and the normal start time as the idle stop time and the re-start time, respectively.

In a tenth modification example relative to the third and fourth embodiments, the temperature sensing member 3168 may be made of bimetal other than the thermo-wax which expands or contracts according to the ambient temperature.

Such changes and modifications are to be understood as being within the scope of the present disclosure as defined by the appended claims.

What is claimed is:

1. A valve timing controller which controls a valve timing of an intake valve that opens and closes a cylinder of an internal combustion engine using a pressure of working fluid, the valve timing controller comprising:
   a housing rotor that is rotatable synchronously with a crankshaft of the internal combustion engine;
   a vane rotor that is rotatable synchronously with a camshaft of the internal combustion engine, the vane rotor receiving the pressure of working fluid in the housing rotor such that a rotation phase of the vane rotor with respect to the housing rotor is changed; and
   a lock mechanism that locks the rotation phase at a main lock phase when the internal combustion engine is started with an ambient temperature more than or equal to a preset temperature, the main lock phase representing the rotation phase set for closing the intake valve at a later timing later than a timing when a piston reaches a bottom dead center in the cylinder of the internal combustion engine, the lock mechanism locking the rotation phase at a sub lock phase representing the rotation phase advanced rather than the main lock phase in the internal combustion engine when the internal combustion engine is started with an ambient temperature lower than the present temperature.

2. The valve timing controller according to claim 1, wherein
   the lock mechanism includes:
   a main lock mechanism that locks the rotation phase which reaches the main lock phase when the internal combustion engine is started with an ambient temperature more than or equal to a preset temperature, the main lock mechanism unlocking the rotation phase from the main lock phase when the internal combustion engine is started with an ambient temperature lower than the present temperature; and
   a sub lock mechanism that locks the rotation phase which reaches the sub lock phase when the internal combustion engine is started,
   the main lock mechanism includes:
   a main lock hole defined in one of the housing rotor and the vane rotor;
   a main lock component supported by the other of the housing rotor and the vane rotor, the main lock component locking the rotation phase at the main lock phase by being fitted to the main lock hole and unlocking the rotation phase from the main lock phase by escaping from the main lock hole;
   a main elastic component which biases the main lock component toward the main lock hole by generating a restoring force; and
   a temperature sensing member which is in a first state allowing the main lock component to be fitted to the main lock hole when an ambient temperature is more than or equal to the preset temperature or in a second state biasing the main lock component to escape from the main lock hole in a direction opposite from the restoring force of the main elastic component when an ambient temperature is less than the preset temperature.

3. The valve timing controller according to claim 2, wherein the valve timing controller controls the valve timing using the pressure of working fluid which starts to be supplied in response to a complete combustion in the internal combustion engine,
   the sub lock mechanism includes:
   a sub lock hole defined in one of the housing rotor and the vane rotor,
   a sub lock component supported by the other of the housing rotor and the vane rotor, the sub lock component locking the rotation phase at the sub lock phase by being fitted to the sub lock hole and unlocking the rotation phase from the sub lock phase by escaping from the sub lock hole; and
   a sub elastic component which biases the sub lock component toward the sub lock hole by generating a restoring force,
   the main lock component and the sub lock component are allowed to be fitted to the main lock hole and the sub lock hole, respectively, when the pressure of working fluid disappears, and
   the main lock component and the sub lock component are biased to escape from the main lock hole and the sub lock hole, respectively, by receiving the pressure of working fluid.

4. The valve timing controller according to claim 2, wherein
   the temperature sensing member is made of bimetal and is arranged between the main lock component and the other of the housing rotor and the vane rotor corresponding to a support rotor which supports the main lock component, and
   the temperature sensing member is switched between the first state and the second state by expanding or contracting according to the ambient temperature.

5. The valve timing controller according to claim 2, wherein
   the main lock component is constructed by combining a movable cylinder which receives the restoring force of the main elastic component to a piston which fits or escapes from the main lock hole,
   the temperature sensing member is made of thermo-wax sealed in an internal chamber of the movable cylinder, the piston reciprocating in the internal chamber of the movable cylinder, and
   the temperature sensing member is switched between the first state and the second state by expanding or contracting according to the ambient temperature, the piston being allowed to be fitted to the main lock hole in the first state and being biased to escape from the main lock hole in the second state.

6. The valve timing controller according to claim 2, wherein the main lock mechanism includes:
- a movable body arranged in the main lock hole, the movable body reciprocating between an open position at which the main lock hole is opened and a close position at which the main lock hole is closed; and
- a control elastic component which biases the movable body toward the main lock component at the main lock phase, wherein the main elastic component biases the main lock component toward the movable body at the main lock phase, the temperature sensing member is made of thermo-wax and is switched between the first state and the second state at the main lock phase at which the main lock component and the movable body contact with each other, and the temperature sensing member has an internal pressure which is raised to a pressure necessary to drive the movable body to the open position opposite from the main lock component in the first state by expanding according to the ambient temperature more than or equal to the preset temperature, and which is lowered to a pressure necessary to drive the movable body to the close position adjacent to the main lock component in the second state by contracting according to the ambient temperature less than the preset temperature.

7. The valve timing controller according to claim 6, wherein the main lock component locks the rotation phase at the sub lock phase by fitting to the sub lock hole as the sub lock component.

8. The valve timing controller according to claim 1, further comprising:
- an advance elastic component which biases the vane rotor on the advance side with respect to the housing rotor at the rotation phase between the main lock phase and the sub lock phase.

9. The valve timing controller according to claim 1, wherein the valve timing controller controls the valve timing using the pressure of working fluid which starts to be supplied in response to a complete combustion in the internal combustion engine, the lock mechanism includes:
- a main lock hole and a sub lock hole defined in one of the housing rotor and the vane rotor;
- a main lock component supported by the other of the housing rotor and the vane rotor;
- a main elastic component which biases the main lock component toward the main lock hole or the sub lock hole by generating a restoring force; and
- a temperature sensing member which is in a first state allowing the main lock component to be fitted to the main lock hole or the sub lock hole when an ambient temperature is more than or equal to the preset temperature or in a second state biasing the main lock component to escape from the main lock hole or the sub lock hole in a direction opposite from the restoring force of the main elastic component when an ambient temperature is less than the preset temperature, the main lock component is allowed to be fitted to the main lock hole or the sub lock hole when the pressure of working fluid disappears, and the main lock component is biased to escape from the main lock hole or the sub lock hole by receiving the pressure of working fluid.

* * * * *